(12) United States Patent
Maekawa

(10) Patent No.: US 6,606,286 B1
(45) Date of Patent: Aug. 12, 2003

(54) TLN SIGNAL GENERATING APPARATUS USED IN OPTICAL DISC DRIVE AND OPTICAL DISC DRIVE EQUIPPED WITH THE APPARATUS, AND OPTICAL DISC DRIVE EQUIPPED WITH AMPLITUDE ADJUSTING APPARATUS FOR TRACKING ERROR SIGNAL

(75) Inventor: Yuichi Maekawa, Tokyo (JP)

(73) Assignee: Mitburri Electric Co., LTD, Tokyo (JP)

( * ) Notice: Subject to any disclaimer, the term of this patent is extended or adjusted under 35 U.S.C. 154(b) by 0 days.

(21) Appl. No.: 09/223,245

(22) Filed: Dec. 30, 1998

(30) Foreign Application Priority Data

| Jan. 5, 1998 | (JP) | 10-011899 |
|---|---|---|
| Jan. 28, 1998 | (JP) | 10-030519 |
| Jan. 28, 1998 | (JP) | 10-030520 |

(51) Int. Cl.$^7$ ................................. G11B 5/09
(52) U.S. Cl. ........................ 369/47.17; 369/59.21
(58) Field of Search .............. 369/44.32, 47.15, 369/47.17, 47.18, 47.25, 47.28, 47.35, 59.17, 59.21

(56) References Cited

U.S. PATENT DOCUMENTS

| 5,199,017 A | | 3/1993 | Kagami et al. | |
| 5,289,446 A | * | 2/1994 | Dekker et al. | 369/44.25 |
| 5,351,224 A | | 9/1994 | Nagata et al. | 369/44 |
| 5,539,710 A | | 7/1996 | Tokushuku et al. | 369/32 |
| 5,566,152 A | | 10/1996 | Takamine et al. | |

FOREIGN PATENT DOCUMENTS

| EP | 90312462.6 | 11/1990 |
| EP | 91308756.3 | 9/1991 |
| EP | 0 809 241 A2 | 11/1997 |
| WO | WO95/31806 | 11/1995 |

* cited by examiner

Primary Examiner—Paul W. Huber
(74) Attorney, Agent, or Firm—Patents & TMS, P.C.

(57) ABSTRACT

An optical disc drive equipped with a TLN signal generating apparatus is disclosed. The TLN signal generating apparatus includes a TLN signal generating circuit for generating a TLN signal (track loss signal) based on signals obtained from an optical pick-up; a digitizing circuit for digitizing the TLN signal by comparing it with a reference level; and a correction circuit for correcting the TLN signal so that it is accurately digitized by the digitizing circuit irrespective of an offset component which is a direct current component contained in the TLN signal. The correction circuit is comprised of an offset component detecting circuit for detecting a level of the offset component contained in the TLN signal; and a signal control circuit for controlling, responsive to the level of the offset component detected by the offset component detecting circuit, a level of the TLN signal generated by the TLN signal generating circuit so that the level of the TLN signal will become a level which does not receive any influence from the level of the direct component. The correction circuit can also be comprised of a signal correcting circuit which amplifies an alternating current component contained in the TLN signal without eliminating a directed current component contained in the TLN signal.

15 Claims, 32 Drawing Sheets

FIG. 8

FRAME FORMAT OF 1 ATIP FRAME (42Bits 1/75sec)

| NUMBER OF BITS | 4 | 8 | 8 | 8 | 14 |
|---|---|---|---|---|---|
| BIT POSITION | 1234 | 111<br>56789012 | 11111112<br>34567890 | 22222222<br>12345678 | 23333333333444<br>90123456789012 |
| DATA | Sync | Min | Sec | Frame | Error Detection Code |

FIG. 14

Q DATA 96Bits FORMAT

| Q1~Q4 | Q5~Q8 | Q9············Q80 | Q81············Q96 |
|---|---|---|---|
| CONTROL | ADDRESS | DATA 72Bits | CRC 16Bits |

TLN SIGNAL

PEAK HOLD SIGNAL 2.5V

VOLTAGE OUTPUTTED FROM
D/A CONVERTER

BOTTOM HOLD SIGNAL 2.5V
2.1V

VOLTAGE OUTPUTTED FROM
D/A CONVERTER

TLN SIGNAL

BOTTOM HOLD SIGNAL

PEAK HOLD SIGNAL (TLN SIGNAL BEFOR PASSING THROUGH HIGH BOOST FILTER)

L1(REFERENCE LEVEL)

(TLN SIGNAL AFTER PASSING THROUGH HIGH BOOST FILTER)

L1(REFERENCE LEVEL)

VOLTAGE OUTPUTTED FROM D/A CONVERTER

TLN SIGNAL

BOTTOM HOLD SIGNAL

PEAK HOLD SIGNAL

TLN SIGNAL GENERATING APPARATUS USED IN OPTICAL DISC DRIVE AND OPTICAL DISC DRIVE EQUIPPED WITH THE APPARATUS, AND OPTICAL DISC DRIVE EQUIPPED WITH AMPLITUDE ADJUSTING APPARATUS FOR TRACKING ERROR SIGNAL

BACKGROUND OF THE INVENTION

1. Field of the Invention

This invention relates to a TLN signal generating apparatus used in an optical disc drive for playing back or recording and playing back an optical disc and an optical disc drive equipped with the TLN signal generating apparatus, and also relates to an optical disc drive equipped with an amplitude adjusting apparatus for a tracking error signal.

2. Description of the Prior Art

Optical discs including read-only type optical discs such as an audio CD (compact disc) and a CD-ROM and recordable type optical discs such as a CD-R or the like are driven by optical disc drives. These optical disc drives are normally equipped with an optical pick-up which is movable along a radial direction of an optical disc and a sled motor for moving the optical disc in the radial direction thereof.

The optical pick-up includes an optical pick-up body equipped with a laser diode and a split photodiode, an objective lens which is supported by the pick-up body by means of suspension springs so as to be freely movable in the radial direction of the optical disc as well as the rotation axial direction thereof, and an actuator for moving the objective lens in the radial direction as well as the axial direction.

In these optical disc drives, data recorded on the optical disc in a spiral manner is reproduced by moving the optical pick-up in the radial direction so as to follow the track while rotating the optical disc.

When the optical pick-up is to be moved to a predetermined track on the optical disc, a track jump control is carried out. For example, when a predetermined music number (e.g. a third music) is selected, the optical pick-up is moved to the predetermined track automatically through the track jump control, thereby enabling to playback the selected music immediately.

The track jump performed in the optical disc drive generally includes a rough search and a fine search. The rough search is used to jump the optical pick-up to a track which is relatively far away from the present position of the optical pick-up, while the fine search is used to jump the optical pick-up to a relatively close track.

Hereinbelow, an explanation is made with regard to the operation of the fine search. In this connection, FIG. 36 is a schematic drawing which shows pre-grooves (WOBBLE) 131a, 131b formed in an optical disc and lands 132a, 132b formed between of the pre-grooves. Information (data) is recorded in the pre-grooves 131a, 131b, that is pits are formed in the pre-grooves 31a, 131b.

A laser beam (comprised of a main beam and a sub-beam) which is emitted from the laser diode is reflected on the pre-grooves 131a, 131b and the lands 132a, 132b, and then the reflected beam 133a to 133c is received by the split photodiode and then converted into electrical signals. Various signals such as a track loss signal (hereinafter, referred to as "TLN signal", details of which will be explained later) and a tracking error signal and the like are produced based on the electrical signals produced by the optical pick-up.

When a fine search is to be carried out, the optical pick-up is moved to the radial direction of the optical disc (the direction indicated by the arrow "Y" in FIG. 36). Therefore, the optical pick-up traverses the pre-grooves and the lands alternately. In this case, as shown in FIG. 37, the TNL signal has a waveform in which the level of the TLN signal S1 raises when the main beam traverses portions defined by the pre-grooves 131a, 131b and the level thereof decreases when the main beam traverses portions defined by the lands 132a, 132b.

Therefore, when a track jump is to be carried out during the fine search, the number of tracks to be jumped can be obtained by counting peaks of the TLN signal S1. In more details, as shown in FIG. 37, a predetermined reference level L1 is pre-set, and a TLN signal is digitized based on the reference level L1. Then, by counting the number that the digitized TLN signal S1 exceeds the reference level L1, it is possible to carry out a track jump to a predetermined track. For example, in the case where a command that moves the optical pick-up for ten tracks is given, the optical pick-up is being moved until the TLN signal obtained from the received beam exceeds the reference level L1 for ten times.

However, actually, the waveform of the TLN signal S1 does not have the same amplitudes in the up and down directions with respect to the reference level L1, and it has an offset component (direct current component). For this reason, the TLN signal S1 is oscillated with respect to a level L2 which is sifted for a predetermined value from the reference level L1. The offset component varies depending on various factors such as ambient temperature, deterioration due to elapse of time, tilting degree of the optical pick-up (improper skew adjustment), and loading condition of the optical disc or the like. Therefore, in the case where the offset component is large, there is a case that the TLN signal S1 does not exceed (cross) the reference level L1 even though the TLN signal is being actually oscillated. In such a case, it is not possible to digitize the TLN signal correctly. With this result, there arises a problem that it is not possible to move the optical pick-up to the designated track, because any one or more of tracks can not be counted during the fine search even though the optical pick-up has actually traversed them. In particular, in the case of CD-R and CD-RW and the like in which no data has yet been recorded, amplitude of TLN signal obtained therefrom is quite small, so that influence from the offset component contained in the TLN signal is relatively large.

Further, in recent years, various optical discs such as CD-R, CD-ROM, CD-RW have been developed and then widely used. Therefore, it is desired that it is possible to playback and record these optical discs with a single optical disc drive in a compatible manner. However, since the reflectances of the reflective layers of CD-R, CD-ROM and CD-RW are different from each other, the tracking error signals obtained from these optical discs are also different from each other. Further, even among the optical discs of the same type, there is a case that amplitudes of tracking error signals are different from each other due to individual differences of the respective optical discs.

Specifically, in the case where an amplitude of a tracking error signal reproduced from a data disc of CD-R (having pre-pits) is supposed to be 1, an amplitude of a tracking error signal reproduced from a data disc of CD-ROM is approximate to 0.7 and an amplitude of a tracking error signal reproduced from a data disc of CD-WR is approximate to 3.5, respectively. Therefore, if amplitude adjustment would not be performed so as to meet the respective disc, a tracking servo will not be engaged properly, thus making it difficult to perform accurate recording and playing back control.

SUMMARY OF THE INVENTION

It is therefore an object of the present invention to provide a TLN signal generating apparatus used in an optical disc drive and an optical disc drive equipped with the apparatus which can accurately and reliably grasp the position of the optical pick up with respect to the optical disc during the movement of the optical pick-up.

It is another object of the present invention to provide an optical disc drive equipped with an amplitude adjusting apparatus for a tracking error signal which can adjust the amplitude of the tracking error signal in an optimum condition irrespective of types of optical discs and individual differences between optical discs.

In order to achieve the object, the present invention is directed to an optical disc drive equipped with a TLN signal generating apparatus, in which the TLN signal generating apparatus comprises:

TLN signal generating means for generating a TLN signal (track loss signal) based on signals obtained from an optical pick-up;

a digitizing circuit for digitizing the TLN signal generated by the TLN signal generating means by comparing it with a reference level; and correction means for correcting the TLN signal generated by the TLN signal generating means so that it is accurately digitized by the digitizing circuit irrespective of an offset component which is a direct current component contained in the TLN signal.

According to the optical disc drive described above, it is possible to digitize the TLN signal accurately without receiving any influence from the offset component contained in the TLN signal. Therefore, in the case where the optical pick-up is moved to a target track by grasping the radial position of the optical pick-up relative to the optical disc based on the TLN signal, it is possible to accurately count the number of tracks above which the optical pick-up has passed, so that it becomes possible to move the optical pickup to the target track accurately. This is particularly effective where optical discs such as CD-R and CD-RW from which a small amplitude TLN signal is obtained are used.

In this optical disc drive, it is preferred that the correction means includes:

offset component detecting means for detecting a level of the offset component contained in the TLN signal; and signal control means for controlling, responsive to the level of the offset component detected by the offset component detecting means, a level of the TLN signal generated by the TLN signal generating means so that the level of the TLN signal will become a level which does not receive any influence from the level of the direct component.

Further, in this case, it is more preferable that the signal control means controls, responsive to the level of the offset component detected by the offset component detecting means, a level of the TLN signal generated by the TLN signal generating means so that the offset component is decreased or eliminated.

Furthermore, it is also preferred that the offset component detecting means is constructed so as to detect a peak value and a bottom value of the TLN signal generated by the TLN signal generating means and then obtain the level of the offset component based on the peak and bottom values.

In this case, it is preferred that the offset component detecting means is constructed so as to detect a median value between a peak value and a bottom value of the TLN signal generated by the TLN signal generating means or a value calculated based on the median value as the level of the offset component.

Moreover, it is also preferred that the signal correction means includes a reference voltage output means for outputting a reference voltage used in generating the TLN signal by the TLN signal generating means; and means for variably controlling the reference voltage outputted from the reference voltage output means.

Since the optical disc drive of the present invention controls the level of the TLN signal by adjusting the reference voltage used in generating the TLN signal, it has a good response to fluctuation of the amplitude of the TLN signal.

Further, preferably, the TLN signal generating apparatus can further comprise an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

By providing such an eccentric component generating means, it is possible to prevent undesired situation in which a waveform of the TLN signal is expanded (an interval between adjacent waves becomes wide) even in the case where a loaded optical disc has less or no eccentric component. Namely, since the interval of adjacent waves becomes narrow, it is possible to stably hold peaks and bottoms of the TLN signal in the peak/bottom detection circuit. As a result, it becomes possible to accurately and reliably perform the offset adjustment for the TLN signal.

Alternatively, it is also preferred that the correction means includes a signal correcting circuit which amplifies an alternating current component contained in the TLN signal generated by the TLN signal generating means without eliminating a directed current component contained in the TLN signal.

According to this structure, since only the alternating component of the TLN signal is amplified without eliminating a direct current component contained in the TLN signal, it has a good response to the fluctuation on the amplitude of the TLN signal.

In this case, it is preferred that the signal correcting circuit is constructed so as not to eliminate an alternating current component contained in the TLN signal and having a frequency less than a first frequency and the direct current component contained therein, but so as to amplify an alternating current component contained in the TLN signal and having a frequency higher than a second frequency which is higher than the first frequency.

In this case, it is preferred that the signal correcting circuit includes a high boost filter.

Another aspect of the present invention is directed to a TLN signal generating apparatus used in an optical disc drive, in which the TLN signal generating apparatus comprises:

TLN signal generating means for generating a TLN signal (track loss signal) based on signals obtained from an optical pick-up;

offset component detecting means for detecting an offset component (direct current component) contained in the TLN signal generated by the TLN signal generating means;

signal control means for controlling, responsive to a level of the offset component detected by the offset component detecting means, a level of the TLN signal generated by the TLN signal generating means so that the offset component in the TLN signal is reduced or eliminated therefrom; and a digitizing circuit for digitizing the TLN signal which has been corrected by the signal control means by comparing it with a reference level.

In this case, it is preferred that the offset component detecting means is constructed so as to detect a peak value and a bottom value of the TLN signal generated by the TLN signal generating means and then obtain the level of the offset component based on the peak and bottom values.

Further, it is also preferred that the offset component detecting means is constructed so as to detect a median value between a peak value and a bottom value of the TLN signal generated by the TLN signal generating means or a value calculated based on the median value as the level of the offset component.

Furthermore, it is also preferred that the signal correction means includes a reference voltage output means for outputting a reference voltage used in generating the TLN signal by the TLN signal generating means; and means for variably controlling the reference voltage outputted from the reference voltage output means.

Preferably, the TLN signal generating apparatus can further comprise an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

The other aspect of the present invention is directed to a TLN signal generating apparatus used in an optical disc drive, in which TLN signal generating apparatus comprises:

TLN signal generating means for generating a TLN signal (track loss signal) based on signals obtained from an optical pick-up;

a signal correcting circuit which amplifies an alternating current component contained in the TLN signal generated by the TLN signal generating means without eliminating a directed current component contained in the TLN signal; and a digitizing circuit for digitizing the TLN signal which has been corrected by the signal correcting circuit by comparing it with a reference level.

In this TLN signal generating apparatus, it is preferred that the signal correcting circuit is constructed so as not to eliminate an alternating current component contained in the TLN signal and having a frequency less than a first frequency and the direct current component contained therein, but so as to amplify an alternating current component contained in the TLN signal and having a frequency higher than a second frequency which is higher than the first frequency.

In this case, it is preferred that the signal correcting circuit includes a high boost filter.

Further, preferably, the TLN signal generating apparatus can further comprise an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

Other aspect of the present invention is directed to an optical disc drive having an amplitude adjusting apparatus for a tracking error signal, in which the amplitude adjusting apparatus comprises:

amplifying means for amplifying a tracking error signal generated based on a signal obtained from an optical pick-up with a variable amplification factor;

amplification value detecting means for detecting an amplification value of the tracking error signal from the amplifying means; and means for variably controlling the amplification factor of the amplifying means so that the amplification value detected by the amplification value detecting means becomes substantially coincide with a reference amplification value which is used as a reference level of the tracking error signal by comparing the amplification value detected by the amplification value detecting means with the reference level of the tracking error signal.

According to the optical disc drive equipped with the amplitude adjusting apparatus described above, it is possible to adjust the value of the amplitude in a constant value irrespective of types of optical discs and individual differences between the same type optical discs. This makes it possible to hold a gain in the tracking servo constant and to obtain stability in the tracking servo operation.

In this case, it is preferred that the amplification factor controlling means of the amplitude adjusting apparatus is adapted to variably control the amplification factor in the amplifying means so that the amplification value of the tracking error signal is substantially coincide with the reference level in the case where the amplification value detected by the amplification value detecting means is less than the reference level.

Further, it is more preferable that the amplification factor controlling means of the amplitude adjusting apparatus is constructed so as to detect a difference between a peak value and a bottom value of the tracking error signal obtained from the amplifying means as the amplification value of the tracking error signal.

Furthermore, preferably, the amplitude adjusting apparatus can further comprise an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

By providing such an eccentric component generating means, it is possible to prevent undesired situation in which a waveform of the tracking error signal is expanded (an interval between adjacent waves becomes wide) even in the case where a loaded optical disc has less or no eccentric component. Namely, since the interval of adjacent waves becomes narrow, it is possible to stably hold peaks and bottoms of the tracking error signal in the peak/bottom detection circuit. As a result, it becomes possible to accurately and reliably perform the amplitude adjustment for the tracking error signal.

Other objects, structures and advantages of the present invention will be apparent when the following description of the preferred embodiment is considered taken in conjunction with the accompanying drawings.

BRIEF DESCRIPTION OF THE DRAWINGS

FIG. 8 is a chart which shows a format of an ATIP frame.

FIG. 14 is a drawing which shows a format of the Q data of 96 bits.

DETAILED DESCRIPTION OF THE PREFERRED EMBODIMENTS

With reference to the appended drawings, a detailed description will now be given for the preferred embodiments of a TLN signal generating apparatus used in an optical disc drive and an optical disc drive equipped with the TLN signal generating apparatus, and an optical disc drive equipped with an amplitude adjusting apparatus for a tracking error signal.

Figure 1:
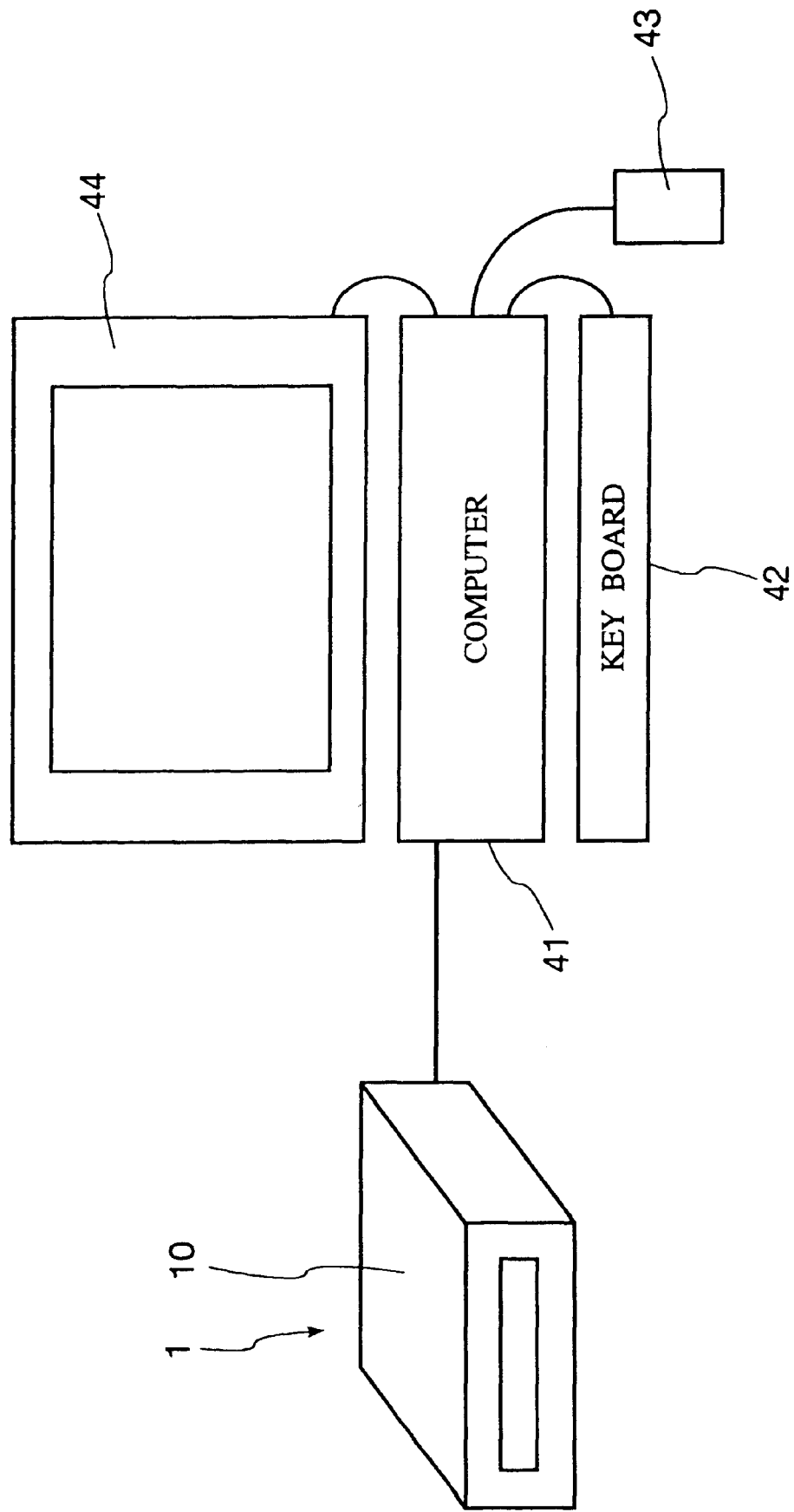
FIG. 1 is an illustration which shows a state that the optical disc drive according to the present invention is connected to an computer.
Figure 2:
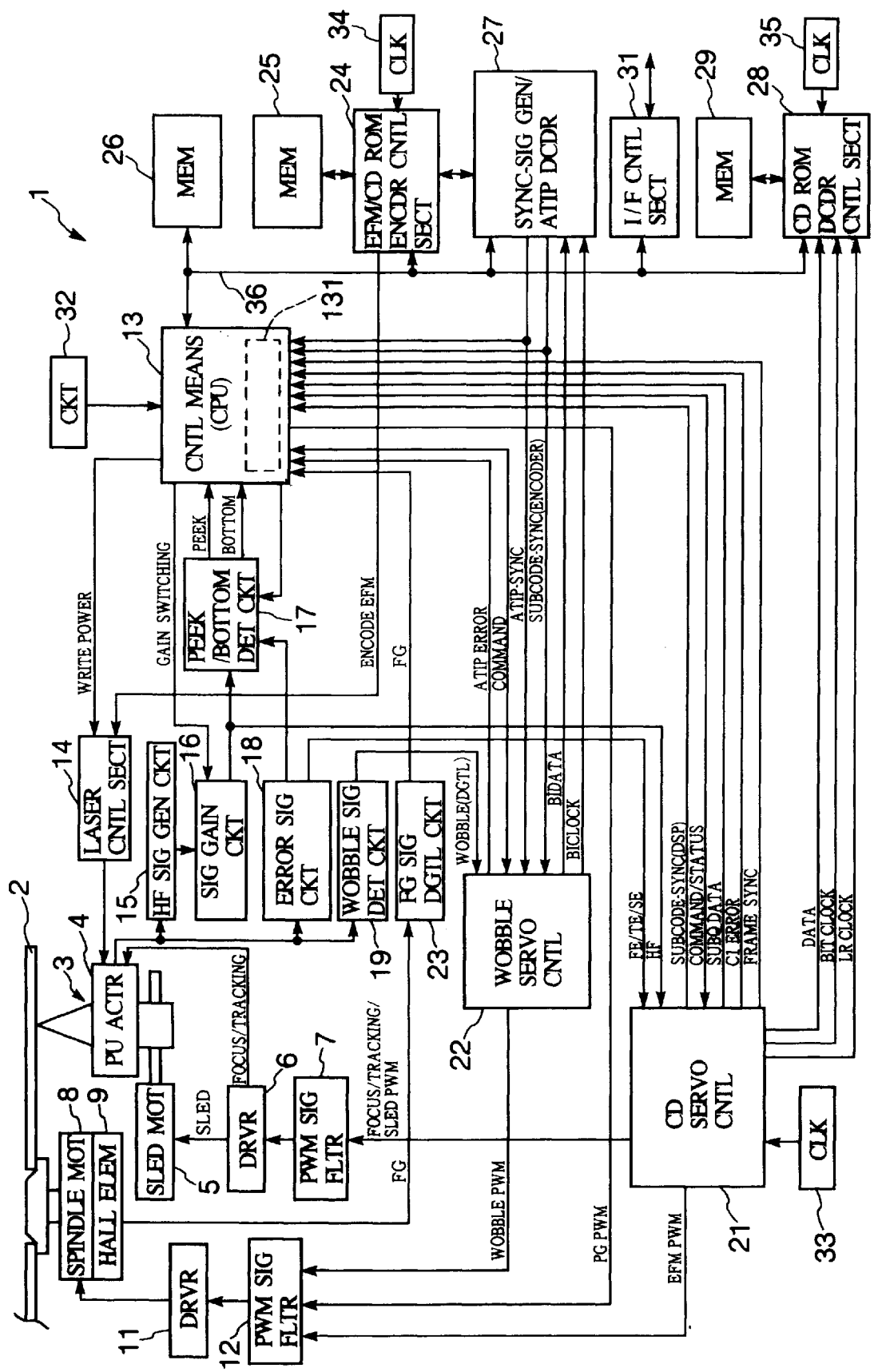
FIG. 2 is a block diagram which shows an embodiment of the optical disc-drive according to the present invention.

FIG. 1 is an illustration which shows an optical disc drive 1 of the present invention in a connected state with a computer, and FIG. 2 is a block diagram which shows an embodiment of the optical disc drive 1 of the present invention.

The optical disc drive 1 shown in these drawings is a CD-R drive for recording and playing back a recordable optical disc (CD-R) 2. In this regard, it is to be noted that this optical disc drive 1 is constructed so as to be able to play back other optical discs such as a CD-ROM and a CD-RW and the like in addition to the CD-R.

In the optical disc 2, a spiral pre-groove (WOBBLE) which is not shown in the drawing is formed.

The pre-groove meanders at a predetermined period (22.05 kHz at the reference rotation speed (1X)), and ATIP (Absolute Time in Pre-groove) information (time information) is previously recorded with the pre-groove. The ATIP information is recorded by being biphase-modulated and further frequency-modulated at a carrier frequency of 22.05 kHz.

The pre-groove functions as a guide groove when forming pits and lands (recording pits and lands) for the optical disc 2. Further, the information recorded by the pre-groove is reproduced and then utilized to control the rotation speed of the optical disc 2 and specify a recording position (absolute time) on the optical disc 2.

The optical disc drive 1 is equipped with a turntable and a spindle motor 8 for rotating the turntable, and includes a rotation driving mechanism (not shown in the drawings) for rotating the turntable when an optical disc 2 is loaded thereon. Further, a Hall element 9 is arranged near the spindle motor 8.

Furthermore, the optical disc drive 1 includes an optical head (hereinafter, referred to as "optical pick-up") 3 capable of movement along a radial direction of the loaded optical disc 2 (i.e., along a radial direction of the turntable); an optical pick-up moving mechanism (not shown in the drawings) equipped with a sled motor 5 to move the optical pick-up 3, that is an optical pick-up base of the optical pick-up 3 along the radial direction of the turntable; drivers 6 and 11; PWM signal smoothing filters 7 and 12; control means 13; a laser control section 14; an HF signal generating circuit 15; an HF signal gain switching circuit 16; a peak/bottom detection circuit 17; a pick-up drive and control signal generating circuit (error signal generating circuit) 18; a WOBBLE signal detection circuit 19; a CD servo controller 21; a WOBBLE servo controller 22; a FG signal digitization circuit 23; an EFM/CD-ROM encoder control section 24; memories 25, 26 and 29; a SYNC signal generating/ATIP decoder 27; a CD-ROM decoder control section 28; an interface control section 31; clocks 32, 33, 34 and 35; and a casing 10 which houses all these elements. Hereinbelow, the radial direction of the optical disc 2 along which the optical pick-up 3 is capable of moving will simply be referred to as the "radial direction"

The optical pick-up 3 includes (but not shown in the drawings) an optical pick-up base equipped with a laser diode (light source) and a split photodiode (light-receiving element), and an objective lens (converging lens). The operation of the laser diode is controlled by the laser control section 14.

The objective lens is supported by suspension springs provided on the pick-up base so as to be movable with respect to the pick-up base along the radial direction and the rotational axial direction of the optical disc 2 (i.e., the axial direction of the turntable). In this way, if the objective lens is shifted from its neutral position (central position), the restoring force of the suspension springs will bias the objective lens toward the neutral position. Hereinbelow, the rotational axial direction of the optical disc 2 will simply be referred to as "axial direction"

Further, the optical pick-up 3 includes an actuator 4 to move the objective lens in the radial direction and the axial direction respectively with respect to the pick-up base.

The control means 13 is generally constructed from a microcomputer (CPU), and it carries out control of the entire optical disc drive 1, including control of the optical pick-up 3 (actuator 4), sled motor 5, spindle motor 8, laser control section 14, HF signal gain switching circuit 16, peak/bottom detection circuit 17, CD servo controller 21, WOBBLE servo controller 22, EFM/CD-ROM encoder control section 24, memories 25, 26 and 29, SYNC signal generating/ATIP decoder 27, CD-ROM decoder control section 28, interface control section 31 and the like.

Further, addresses, data, commands and the like from the control means 13 are inputted via an address/data bus 36 into the EFM/CD-ROM encoder control section 24, the memory 26, the SYNC signal generating/ATIP decoder 27, the CD-ROM decoder control section 28 and the interface control section 31 and the like.

An separate apparatus (in the present embodiment, a computer 41) can be freely connected to (and disconnected from) the optical disc drive 1 via the interface control section 31, and this makes it possible for the optical disc drive 1 and the computer 41 to communicate with each other.

As for the interface control section 31, it is possible to use an ATAPI (IDE) (ATAPI Standard), SCSI (SCSI Standard) or the like, for example.

A keyboard 42, a mouse 43 and a monitor 44 are connected to the computer 41, respectively.

In this regard, it is to be noted that the interface control section 31 constitutes transmission means of the present invention.

Further, it is also to be noted that the HF signal generating circuit 15, the HF signal gain switching circuit 16, the peak/bottom detection circuit 17, the PU drive and control signal generating circuit 18, the WOBBLE signal detection circuit 19, the CD servo controller 21 and the WOBBLE servo controller 22 constitute a signal processing means.

Furthermore, the optical pick-up body moving mechanism and the actuator 4 constitute an optical pick-up moving mechanism.

Next, the operation of the optical disc drive 1 will be described.

While carrying out focus control, tracking control, sled control and rotation control (rotation speed control), the optical disc drive 1 records (writes in) and plays back (read out) information (data) to and from a predetermined track of the optical disc 2. Hereinbelow, the operations carried out during (1) recording, (2) playback, (3) focus control, tracking control and sled control, (4) track jump control (control for movement of the optical pick-up), (5) control for rotation number (rotation speed control), (6) eccentric component generating operation, (7) canceling operation for offset component of TLN signal, and (8) amplitude adjusting operation for tracking error signal will be described in this order.

First, as shown in FIG. 2, a predetermined COMMAND signal from the control means 13 is inputted into the CD servo controller 21. Further, a predetermined COMMAND signal from the control means 13 is inputted into the WOBBLE servo controller 22.

These COMMAND signals supplied from the control means 13 to the CD servo controller 21 and the WOBBLE servo controller 22 are signals for executing predetermined operations (e.g., to start controls and the like).

Then, a predetermined STATUS signal from the CD servo controller 21 is inputted into the control means 13. Further, a predetermined STATUS signal from the WOBBLE servo controller 22 is inputted into the control means 13.

These STATUS signals are in response to the commands mentioned above, namely, such status signals indicate information concerning statuses for the controls mentioned above (e.g., control success, control failure, control being carried out and other statuses).

(1) Recording

When data (signals) is to be recorded (written in) in the optical disc 2, the pre-groove formed in the optical disc 2 is reproduced (read out), after which the data is recorded along the pre-groove.

When the data (signals) to be recorded on the optical disc 2 is inputted into the optical disc drive 1 via the interface control section 31, such data is inputted into the EFM/CD-ROM encoder control section 24.

In the EFM/CD-ROM encoder control section 24, such data is encoded in response to a clock signal (i.e., at the timing of the clock signal) from the clock 34 and then undergoes modulation (EFM modulation) by a modulation method known as EFM (Eight to Fourteen Modulation) to form ENCODE EFM signals.

Figure 3:
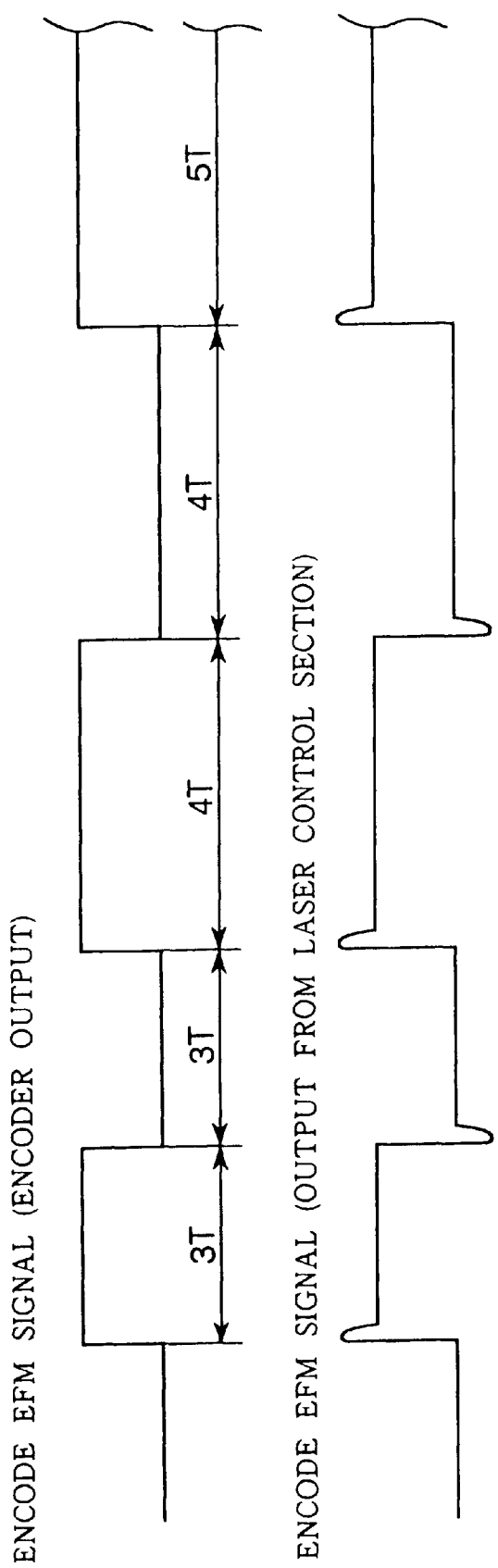
FIG. 3 is a timing chart which shows the ENCODE EFM signal from the EFM/CDROM encoder and the ENCODE EFM signal from the laser control section in the optical disc drive according to the present invention.

As shown in FIG. 3, these ENCODE EFM signals are formed from pulses each having a predetermined length (period) of any one of 3T–11T.

Figure 4:
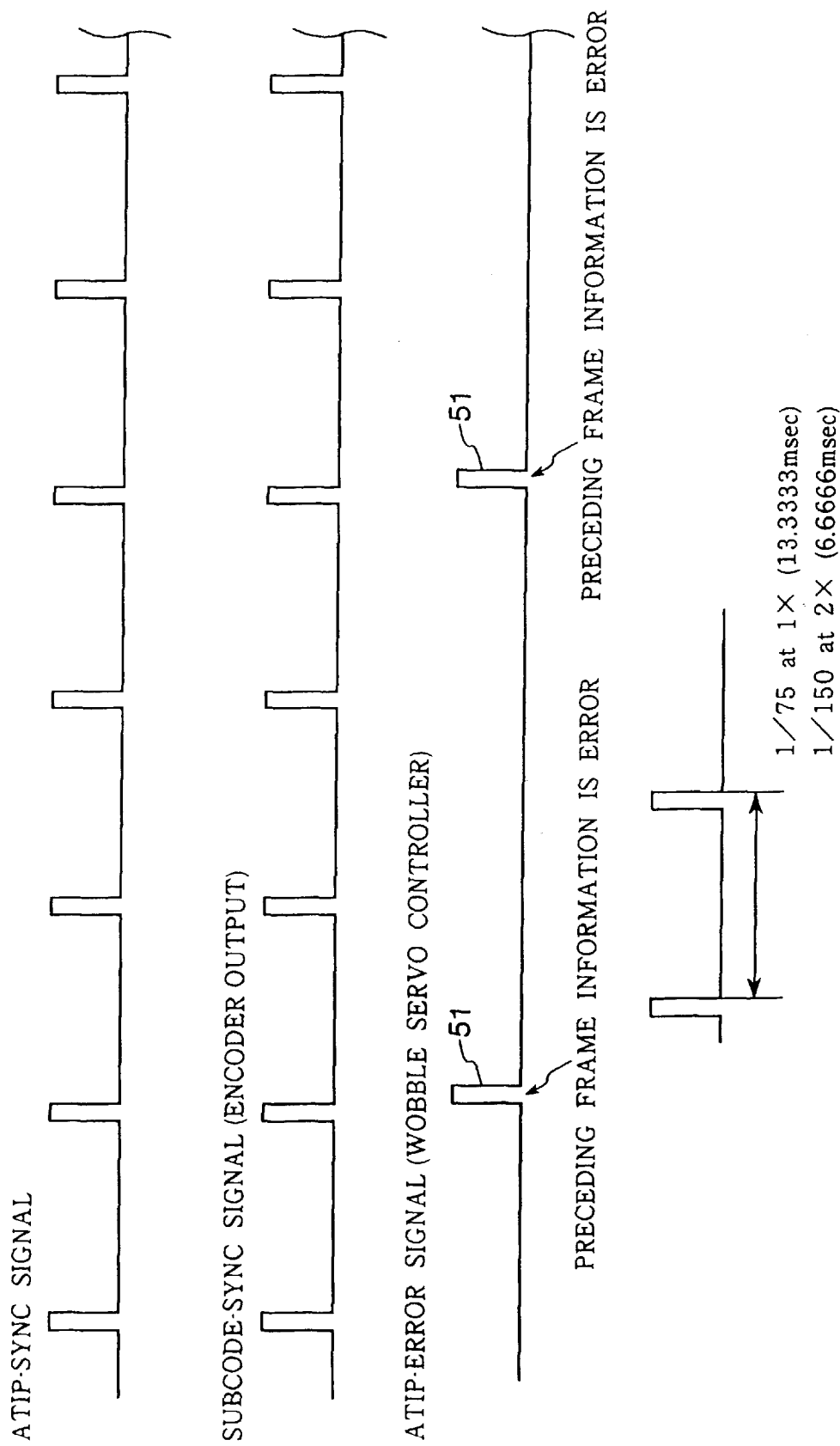
FIG. 4 is a timing chart which shows the ATIP-SYNC signal, the SUBCODE-SYNC signal from the SYNC signal generating/ATIP decoder and the ATIP error signal in the optical disc drive according to the present invention.
Figure 5:
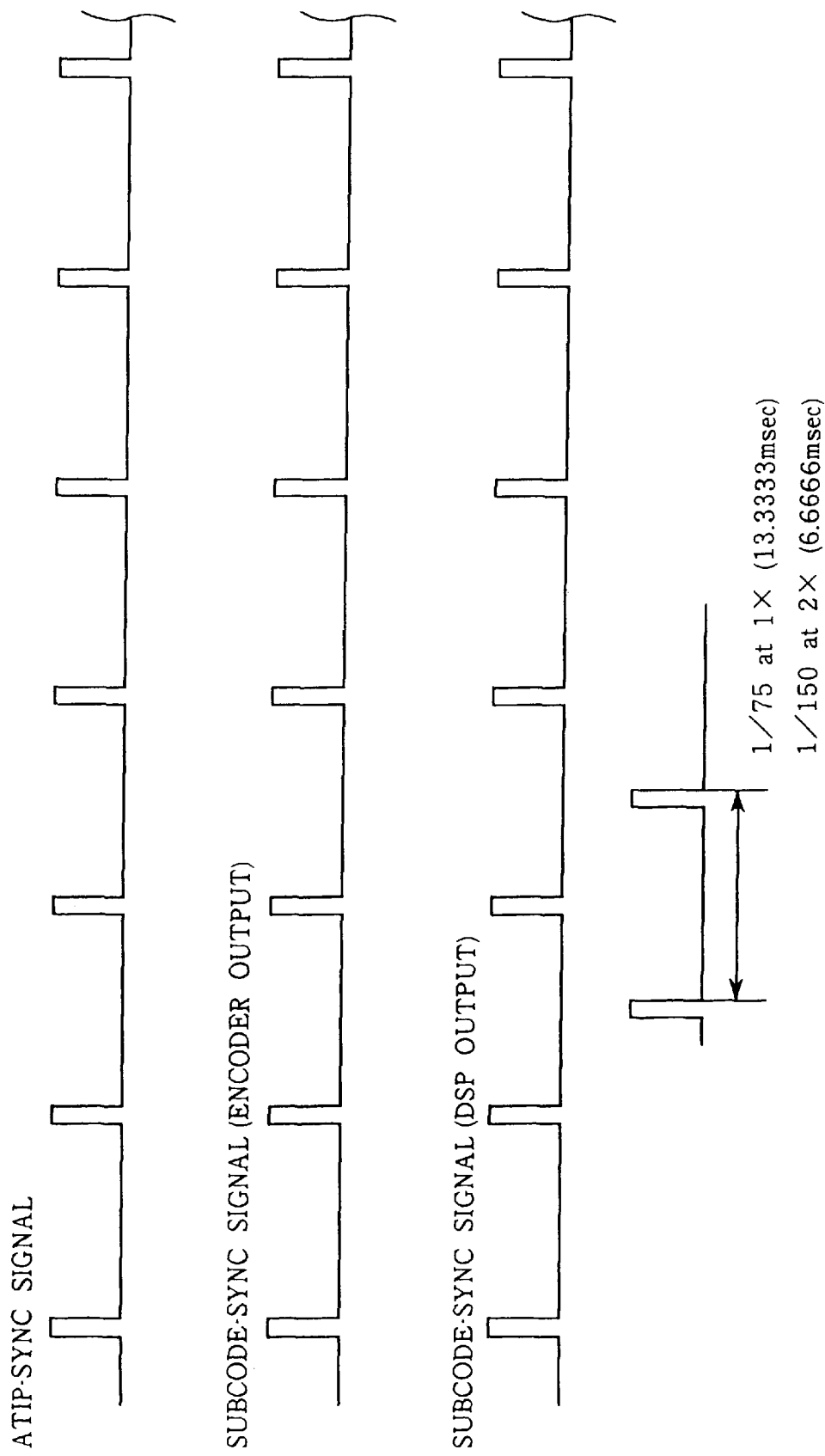
FIG. 5 is a timing chart which shows the ATIP-SYNC signal, the SUBCODE-SYNC signal from the SYNC signal generating/ATIP decoder and the SUBCODE-SYNC signal from the CD servo controller in the optical disc drive according to the present invention.

Further, as shown in FIGS. 4 and 5, in the EFM/CD-ROM encoder control section 24, the clock signal from the clock 34 is divided, and a SUBCODE-SYNC signal composed of pulses having a predetermined period is generated. The pulse period of this SUBCODE-SYNC signal (i.e., the time interval between adjacent pulses) is 1/75 second for the case of the reference rotation speed (1X).

During the encoding described above, a synchronizing signal, that is a SYNC pattern is added to the ENCODE EFM signal based on the SUBCODE-SYNC signal (i.e., on the timing of the SUBCODE-SYNC signal). Namely, the SYNC pattern is respectively added to a portion corresponding to the head portion of each SUBCODE frame.

This ENCODE EFM signal is inputted into the laser control section 14 from the EFM/CD-ROM encoder control section 24.

Further, a WRITE POWER signal (voltage) in the form of analogue signal is outputted from a D/A converter (not shown in the drawings) provided in the control means 13, and it is then inputted into the laser control section 14.

Based on the ENCODE EFM signal, the laser control section 14 switches the level of the WRITE POWER signal from the control means 13 between a high level (H) and a low level (L), and then outputs such signal, thereby controlling the operations of the laser diode of the optical pick-up 3.

In particular, during the period of time in which the ENCODE EFM signal is in a high (H) level, the laser control section 14 outputs a high level (H) WRITE POWER signal. Namely, the laser output is increased (to a level for writing in data). Then, during the period of time in which the ENCODE EFM signal is in a low (L) level, the laser control section 14 outputs a low level (L) WRITE POWER signal. Namely, the laser output is decreased (returned to a level for reading out data).

Thus, when the ENCODE EFM signal level is in the high (H) level, a pit having a predetermined length is formed in the optical disc 2, and when the ENCODE EFM signal level is in the low (L) level, a land having a predetermined length is formed in the optical disc 2.

In this way, data is written (recorded) in a predetermined track of the optical disc 2 with thus formed pits and lands.

In the EFM/CD-ROM encoder control section 24, a predetermined ENCODE EFM signal (random EFM signal) is generated in addition to the above-mentioned ENCODE EFM signal. This random EFM signal is used for output adjustment (power control) of the laser when trial writing to a test area is carried out under OPC (Optimum Power Control) procedure.

When the trial writing to a test area is carried out under the OPC procedure, the random EFM signal is inputted into the laser control section 14 from the EFM/CD-ROM encoder control section 24.

Further, when the trial writing to a test area is carried out under the OPC procedure, WRITE POWER signals of 15-step levels are generated in the control means 13, and these WRITE POWER signals are outputted from the D/A converter (not shown in the drawings) provided in the control means 13 and then inputted into the laser control section 14.

Then, based on the random EFM signal, the laser control section 14 switches the level of the WRITE POWER signals from the control means 13 between a high level (H) and a low level (L), and then outputs such signals, thereby controlling the operations of the laser diode of the optical pick-up 3. This is done for each of the 15-step level WRITE POWER signals.

In this way, under the OPC procedure, trial writing to a test area can be carried out with laser light having 15-step output levels.

Further, when writing data in the optical disc 2, laser light at a read-out output level is emitted from the laser diode of the optical pick-up 3 onto the pre-groove of the optical disc 2, and the light reflected therefrom is received by the split photodiode of the optical pick-up 3.

Figure 6:
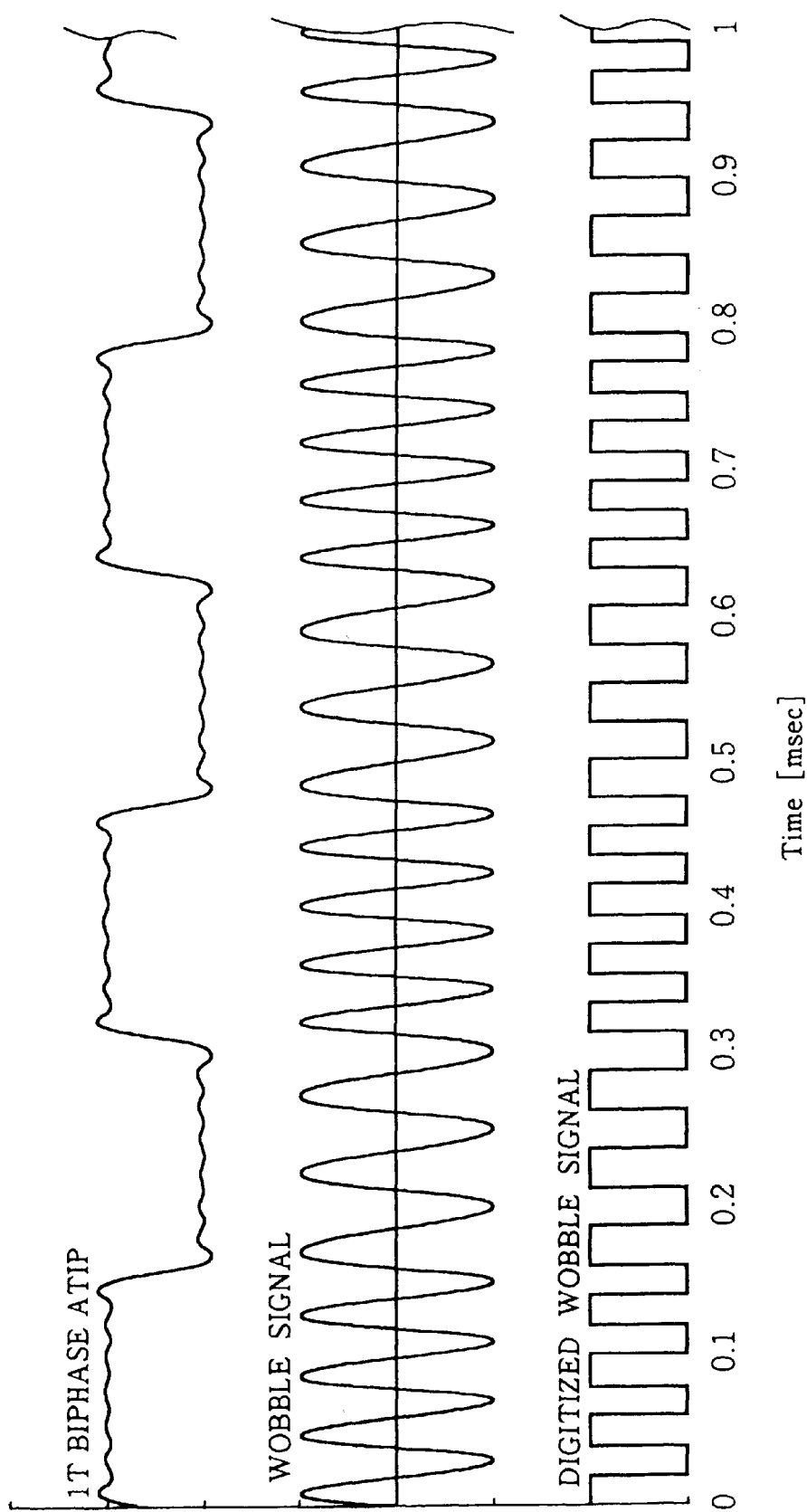
FIG. 6 is a timing chart which shows the 1T Biphase ATIP timing, the WOBBLE signal and the digitized WOBBLE signal in the optical disc drive according to the present invention.

The WOBBLE signal having a waveform shown in FIG. 6 is outputted from this split photodiode. As was mentioned above, the WOBBLE signal includes the 22.95 kHz signal at the reference rotation speed (1X) and the signal obtained by biphase modulating the ATIP information and further frequency-modulating it at a carrier frequency of 22.05 kHz.

This WOBBLE signal is inputted into the WOBBLE signal detection circuit 19, where it undergoes digitization.

The digitized WOBBLE signal is then inputted into the WOBBLE servo controller 22.

Figure 7:
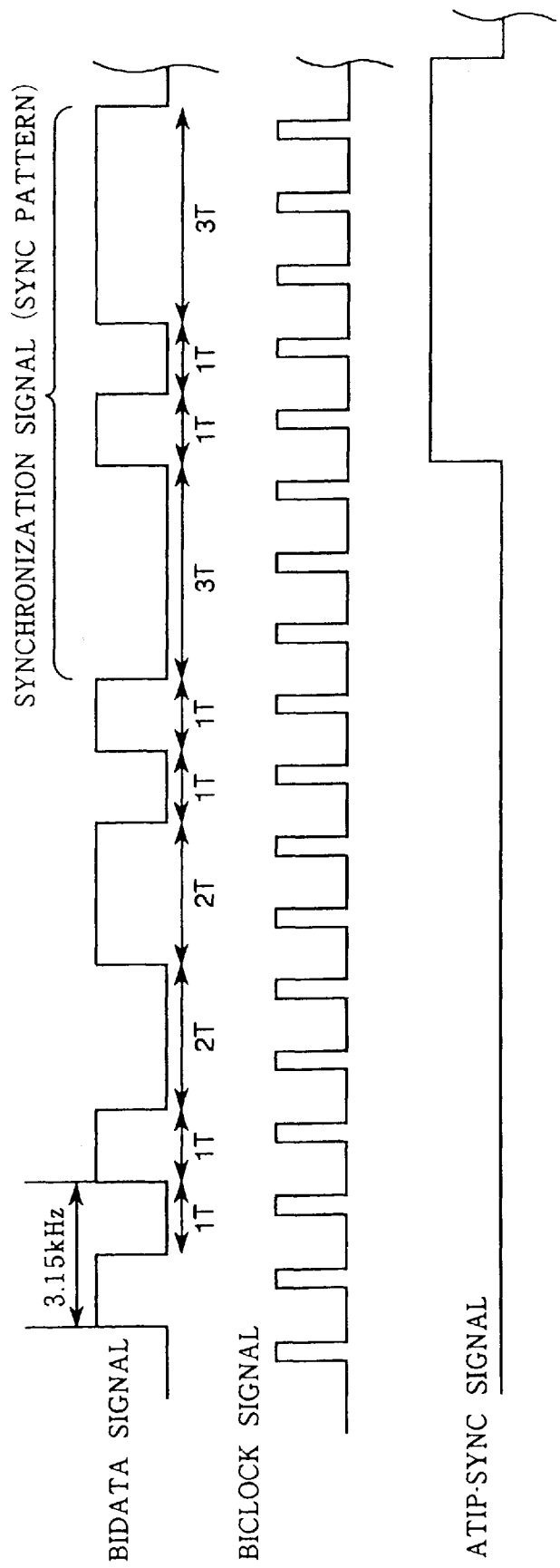
FIG. 7 is a timing chart which shows the BIDATA signal, the BICLOCK signal and the ATIP-SYNC signal in the optical disc drive according to the present invention.

In the WOBBLE servo controller 22, the frequency-modulated ATIP information in the WOBBLE signal is demodulated to obtain the BIDATA signal (biphase signal) shown in FIG. 7. This BIDATA signal is a pulse signal having a length of any one of 1T–3T. Further, by biphase demodulating and then decoding this BIDATA signal, it is possible to obtain the ATIP information.

Further, in a digital PLL circuit (not shown in the drawings) provided in the WOBBLE servo controller 22, a clock is generated based on the BIDATA signal to obtain the BICLOCK signal shown in FIG. 7. This BICLOCK signal is used for timing for decoding the BIDATA signal (described later).

The BIDATA signal and the BICLOCK signal are respectively inputted into the SYNC signal generating/ATIP decoder 27.

In the SYNC signal generating/ATIP decoder 27, the BIDATA signal is biphase demodulated based on the BICLOCK signal, and the biphase demodulated BIDATA signal is then decoded to obtain the ATIP information. Further, the ATIP-SYNC signal (used as the first synchronizing signal) shown in FIG. 7 is also generated.

In this case, as shown in FIG. 7, the ATIP-SYNC signal pulse is generated when the SYNC pattern included in the BIDATA signal is detected. The period of this ATIP-SYNC signal pulse (i.e., the time interval between adjacent pulses) is 1/75 second for the case of the reference rotation speed (1X).

This ATIP-SYNC signal is inputted into the control means 13 and the WOBBLE servo controller 22, respectively.

Further, the decoded ATIP information is inputted into the control means 13. In this way, the control means 13 can obtain information concerning a specific position on the optical disc 2 (the absolute time) from this ATIP information.

The above-mentioned SUBCODE-SYNC signal from the EFM/CD-ROM encoder control section 24 is inputted into the SYNC signal generating/ATIP decoder 27, after which such SUBCODE-SYNC signal is respectively inputted into the control means 13 and the WOBBLE servo controller 22 from the SYNC signal generating/ATIP decoder 27.

FIG. 8 is a chart showing the frame format of the ATIP frame. As shown in this drawing, the frame format of one ATIP frame is comprised of 4-bits for synchronizing signal (Sync); 8-bits for minutes (Min); 8-bits for seconds (Sec); 8-bits for frames (Frame); and 14-bits for error detection code (CRC: Cyclic Redundancy Code).

In the WOBBLE servo controller 22, the ATIP information of each of the ATIP frames undergoes an error detection process (to determine whether or not the ATIP information is wrong).

In this ATIP information error detection process, if the results of a predetermined operation performed on the data of the Sync, Minutes, Seconds and other data of the ATIP frame match the error detection code (CRC), such a state is defined as a "normal", and if the results don't match the error detection code, such a state is defined as a "ATIP error".

In this case, if it is found that the ATIP information is wrong, namely if an ATIP error is detected, a pulse 51 will be generated in the WOBBLE servo controller 22 as an ATIP error signal, and then it is outputted, as shown in FIG. 4.

The ATIP error signal which is formed from the pulse 51 is inputted into a counter (counting means) 131 provided in the control means 13. Then, the number of the pulses of the ATIP error signal is counted by the counter 131, and the number of the pulses of the ATIP error signal is defined as the number of ATIP errors.

In this regard, because this error detection process is carried out on the ATIP information for each ATIP frame, a maximum of 75 ATIP errors can occur in 75 ATIP frames (in one second at the reference rotation speed (1X)).

In this connection, a detection means for detecting such ATIP errors is constructed from the WOBBLE servo controller 22.

The counted value of the ATIP error is stored in the memory 26 and is also transmitted to the computer 41 via the interface control section 31 to be utilized in examining the optical disc drive 1 (to judge the recording performance of the optical disc drive 1).

The ATIP-SYNC signal inputted into the control means 13 is utilized to the timing of renewal of ATIP time information.

Further, the ATIP-SYNC signal inputted into the WOBBLE servo controller 22 is used for synchronization with the SUBCODE-SYNC signal.

The SUBCODE-SYNC signal inputted into the control means 13 is utilized for compensation (interpolation) of the ATIP time information and the measurement of the ATIP error described above.

Further, the SUBCODE-SYNC signal inputted into the WOBBLE servo controller 22 is utilized as a reference signal for synchronization in the same manner as the ATIP-SYNC signal described above.

In this connection, the synchronization is carried out such that the timing of the SUBCODE-SYNC signal in the EFM data generated when writing data becomes substantially synchronized with the timing of the ATIP-SYNC signal obtained from the optical disc 2.

Figure 9:
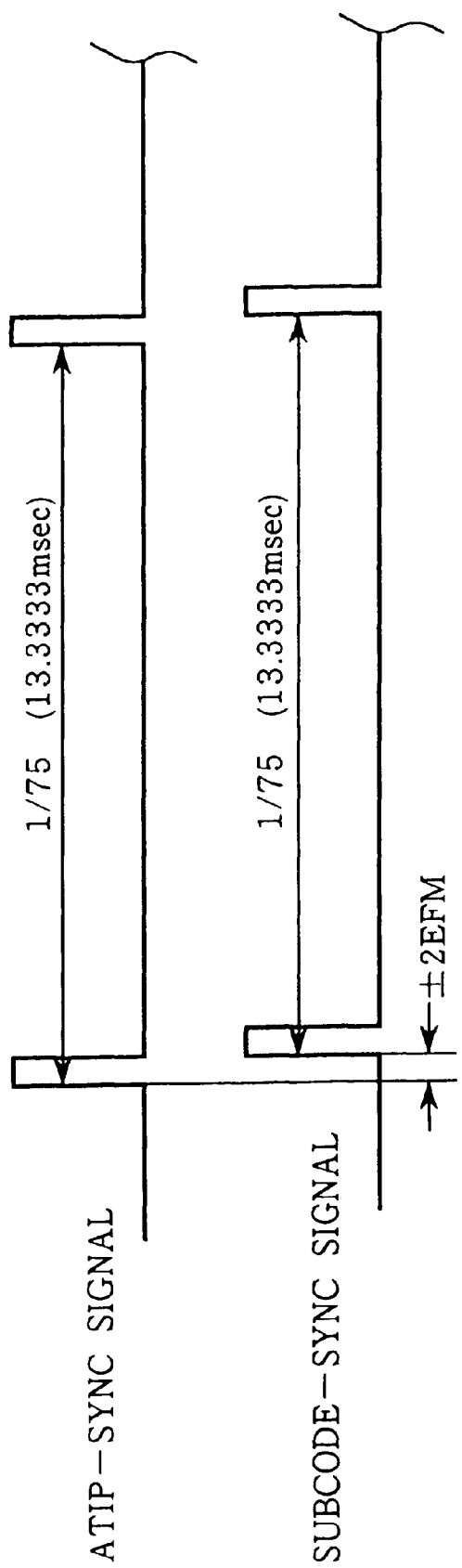
FIG. 9 is a timing chart which shows the ATIP-SYNC signal and the SUBCODE-SYNC signal in the optical disc drive according to the present invention.

As shown in FIG. 9, the SUBCODE-SYNC signal and the ATIP-SYNC signal are normally allowed to shift up to±2 EFM frames to each other at the respective position on the entire optical disc 2.

(2) Playback (Reproduce)

When data (signals) are to be played back (read out) from the optical disc 2, the level of the WRITE POWER signal supplied from the laser control section 14 is maintained at a predetermined DC level corresponding to a read-out output, and in this way, the laser output is maintained at the read-out output level. Normally, the read-out output (the output of the main beam) is set to be equal to or less than 0.7 mW.

On the other hand, when data is being read out from the optical disc 2, laser light at the read-out output level is emitted from the laser diode of the optical pick-up 3 onto a predetermined track of the optical disc 2, and the light reflected therefrom is received by the split photodiode of the optical pick-up 3.

Then, electrical currents (voltages) corresponding to the quantity of received light are outputted respectively from each light-receiving portion of the split photodiode of the optical pick-up 3, and these currents, namely, each signal (detection signal) is respectively inputted into the HF signal generating circuit 15 and the PU drive and control signal generating circuit 18.

In the HF signal generating circuit 15, these detection signals undergo addition, subtraction and the like to generate an HF (RF) signal.

This HF signal is an analog signal corresponding to pits and lands formed in the optical disc 2.

As described above, this HF signal is inputted into the HF signal gain switching circuit 16 and then amplified. The amplification factor (gain) of the HF signal gain switching circuit 16 is switched by a gain switching signal supplied from the control means 13.

The amplified HF signal (hereafter, referred to as the "HF signal") is respectively inputted into the peak/bottom detection circuit 17 and the CD servo controller 21.

Further, a tracking error (TE) signal (which is described hereinbelow under (3) Focus Control, Tracking Control and Sled Control) is inputted into the peak/bottom detection circuit 17.

Figure 10:
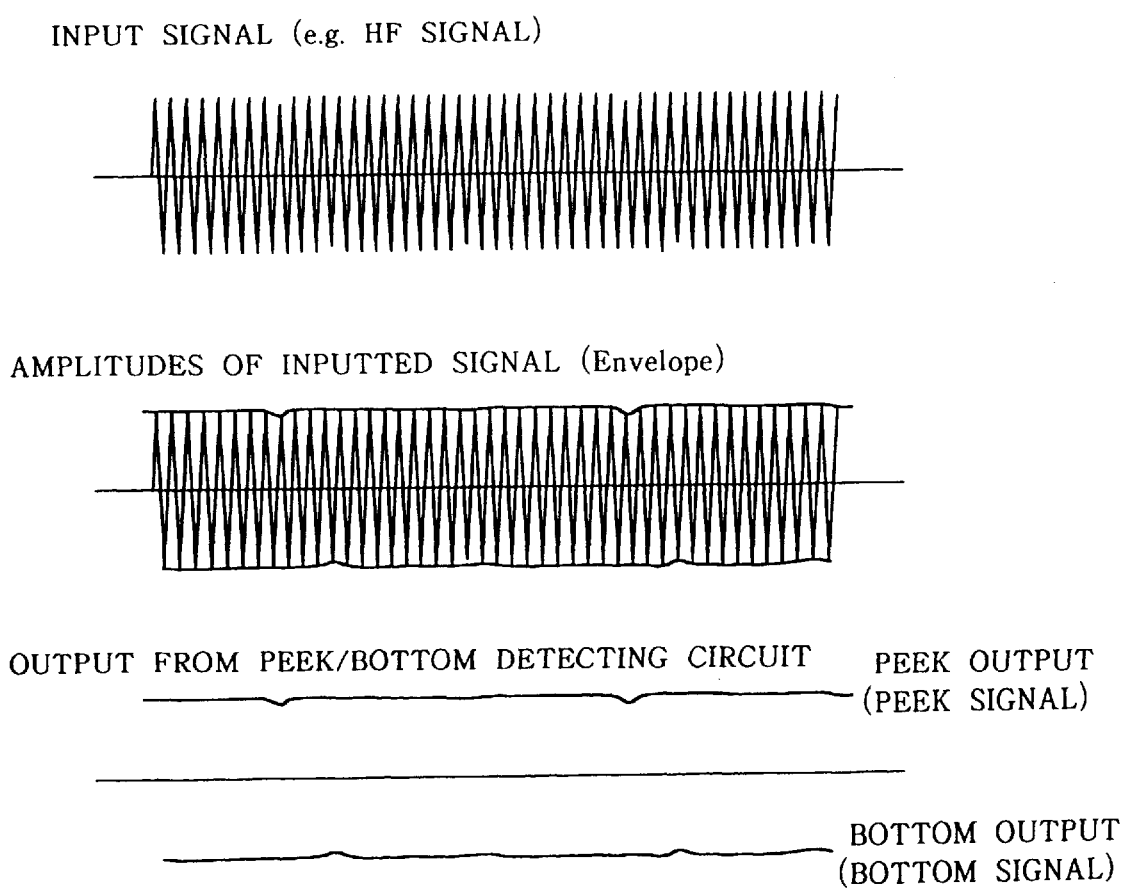
FIG. 10 is a timing chart which shows an input signal inputted to the peak/bottom detecting circuit, the amplitudes of the inputted signal (envelope), and the PEAK signal and the BOTTOM signal in the optical disc drive according to the present invention.

As shown in FIG. 10, in the peak/bottom detection circuit 17, the amplitudes (envelope) of the inputted signals such as the HF signal and the tracking signal are extracted.

The top and bottom of the amplitude are referred to respectively as the "PEAK (TOP)" and "BOTTOM", wherein the signal corresponding to the tops of the amplitudes is referred to as "PEAK signal", and the signal corresponding to the bottoms of the amplitudes is referred to as "BOTTOM signal".

The PEAK signal and the BOTTOM signal are respectively inputted into the A/D converter (not shown in the drawings) in the control means 13, and in this A/D converter such signals are converted into digital signals.

These PEAK and BOTTOM signals are used, for example, to measure the amplitude, to adjust the amplitude of the tracking error signal, to calculate the β value in the OPC (Optimum Power Control) procedure, and to determine the presence or absence of the HF signal.

In the CD servo controller 21, the HF signal is digitized and then EFM demodulated to obtain an EFM signal. This EFM signal is a signal formed by a pulse having a length (period) corresponding to any one of 3T–1T.

Then, in the CD servo controller 21, an error correction (CIRC error correction) which uses an error correction code referred to as a CIRC (Cross Interleaved Read Solomon Code) is carried out twice on this EFM signal.

In this case, the first CIRC correction is referred to as a "C1 error correction", and the second CIRC correction is referred to as a "C2 error correction".

Further, the case where error correction can not be carried out by the first CIRC correction, that is by the C1 error correction, is referred to as a "C1 error", and the case where error correction can not be carried out by the second CIRC correction, that is by the C2 error correction" is referred to as a "C2 error".

Figure 11:
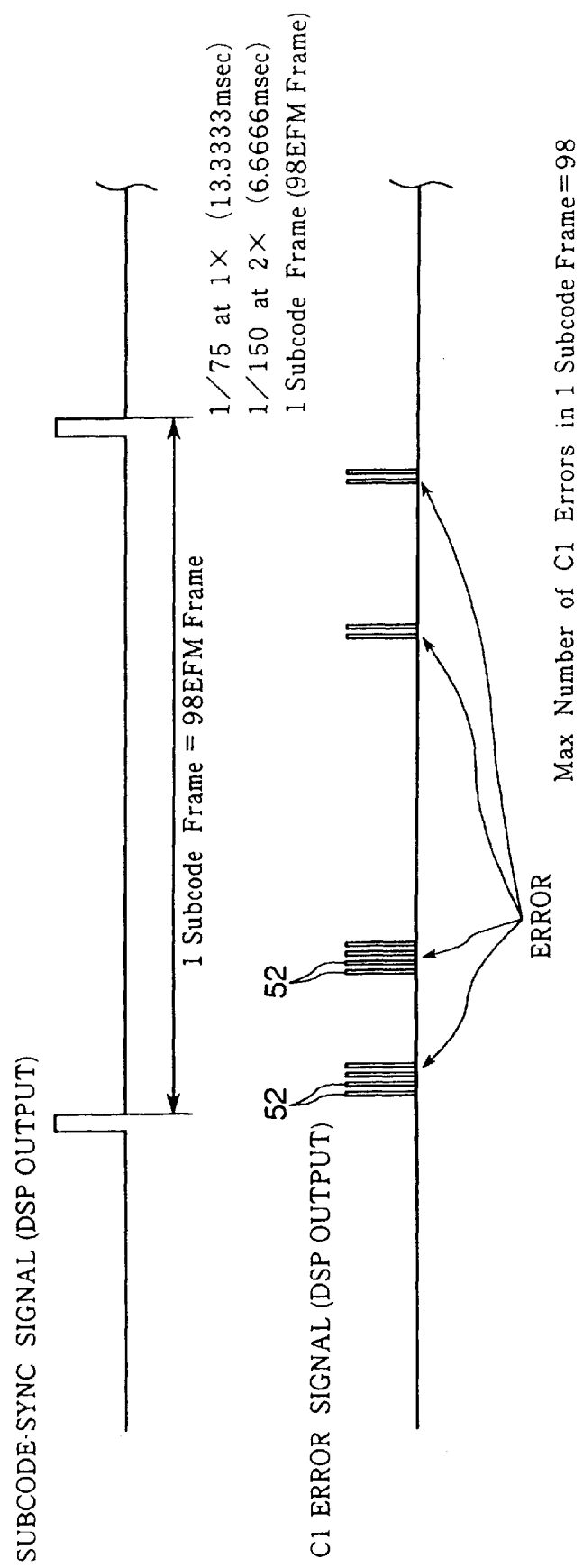
FIG. 11 is a timing chart which shows the SUBCODE-SYNC signal from the CD servo controller and the Cl ERROR signal in the optical disc drive according to the present invention.

As shown in FIG. 11, if a C1 error is detected in the CD servo controller 21 during the C1 error correction, a pulse 52 is generated and then it is outputted.

The C1 error signal comprised of the pulses 52 is inputted into the counter 131 of the control means 13. Then, the number of the pulses of the C1 error signal is counted (measured) by the counter 131 as the number of C1 errors.

Now, because one subcode frame is comprised of 98 EFM frames, a maximum number of 7350 C1 and C2 errors can occur respectively in 75 subcode frames (in one second at the reference rotation speed (1X)).

In this regard, it is to be understood that the CD servo controller 21 constitutes a detection means for detecting the C1 error.

The counted value of C1 errors is stored in the memory 26 and is also transmitted to the computer 41 via the interface control section 31 to be utilized in examining the optical disc drive 1 (to judge the playback performance or the recording/playback performance of the optical disc drive 1).

In the CD servo controller 21, the EFM signal after CIRC error correction has been carried out is decoded (converted) into a predetermined format data, namely a DATA signal.

Next, a description will be given with reference to the typical case in which audio data (music data) is recorded on an optical disc 2 and its EFM signal is decoded into an audio format DATA signal.

Figure 12:
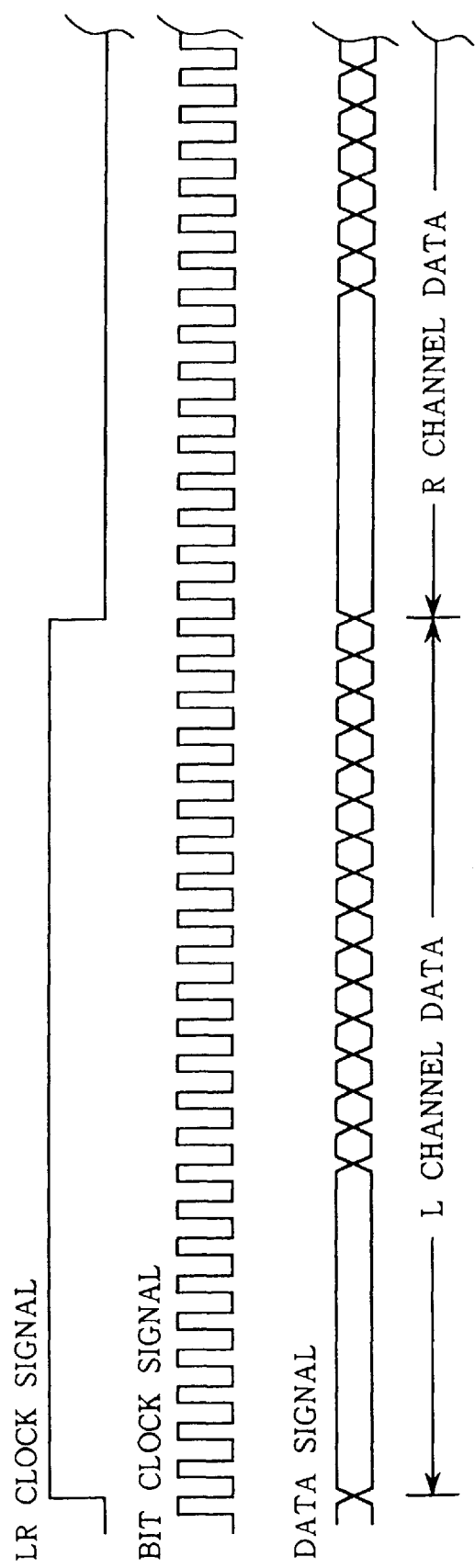
FIG. 12 is a timing chart which shows the DATA signal of an audio format, the LRCLOCK signal and the BITCLOCK signal in the optical disc drive according to the present invention.

In this connection, FIG. 12 is a timing chart showing an audio format DATA signal, an LRCLOCK signal and a BITCLOCK signal.

As shown in this drawing, in the CD servo controller 21, the EFM signal is decoded into a DATA signal comprised of 16-bit L-channel data and 16-bit R-channel data based on a clock signal from the clock 33.

Further, in the CD servo controller 21, the BITCLOCK signal and the LRCLOCK signal are respectively generated based on the clock signal from the clock 33.

This BITCLOCK signal is a serial data transfer clock. Further, the LRCLOCK signal is a signal for discriminating the L-channel data and the R-channel data in the DATA signal. In this case, the high (H) level of the LRCLOCK signal represents the L-channel data, and the low (L) level of the LRCLOCK signal represents the R-channel data.

Now, in the case where normal data other than audio data is recorded on the optical disc 2, the EFM signal thereof is also decoded into a DATA signal comprised of the above-mentioned 16-bit L-channel data and 16-bit R-channel data.

The DATA signal, the LRCLOCK signal and the BITCLOCK signal are respectively inputted into the CD-ROM decoder control section 28.

In the case where error correction information such as ECC (Error Correction Code)/EDC (Error Detecting Code) is recorded on the optical disc 2, error correction is carried out for the DATA signal in the CD-ROM decoder control section 28.

This ECC/EDC is an error correction code used in a CD-ROM MODE 1 format. With this error correction, it is possible to reduce the bit error rate to a degree of $10^{-12}$.

Next, in the CD-ROM decoder control section 28, the DATA signal is decoded into predetermined format data for communication (transmission) based on the clock signal from the clock 35, and this decoded data is then transmitted to the computer 41 via the interface control section 31.

In the computer 41, for example, this decoded data is encoded, and then this encoded data is recorded (copied) into a predetermined recording medium (e.g., a hard disc).

Figure 13:
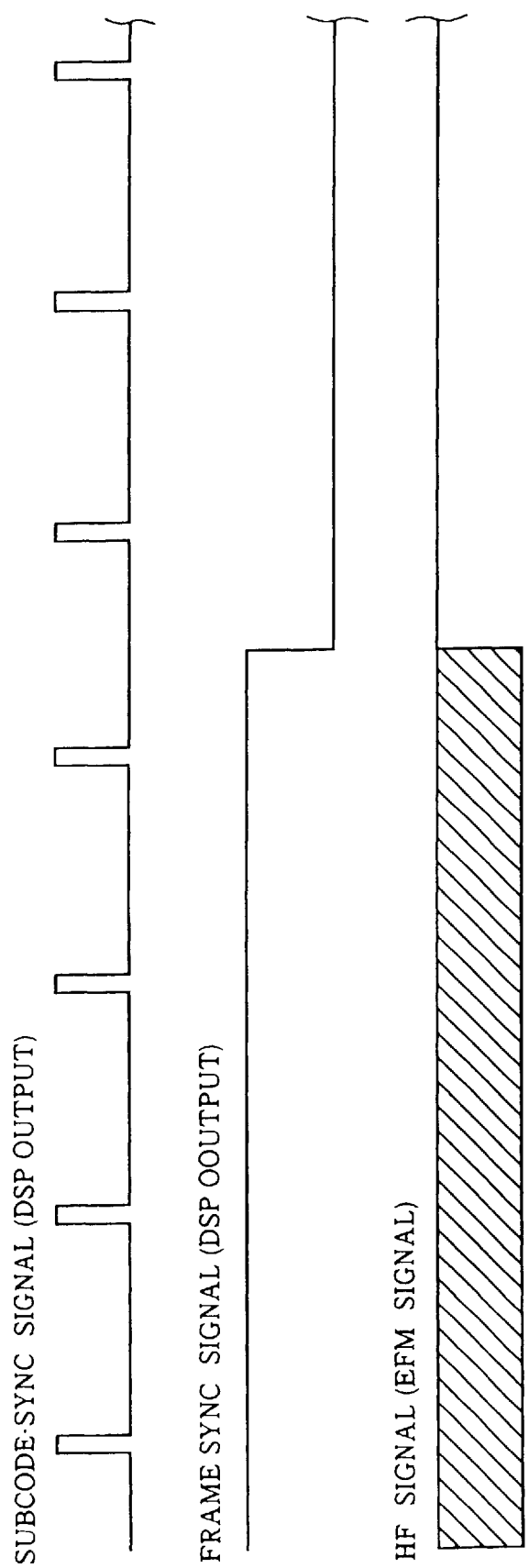
FIG. 13 is a timing chart which shows the SUBCODE-SYNC signal from the CD servo controller, the FRAM SYNC signal, the HF signal (EFM signal) in the optical disc drive according to the present invention.

Further, the FRAME SYNC signal shown in FIG. 13 is generated in the CD servo controller 21.

The level of this FRAME SYNC signal becomes high (H) when the HF signal is inputted into the CD servo controller 21 and the EFM signal is being synchronized at a specified period (3T–11T). Further, if no HF signal becomes inputted (i.e., if the EFM signal becomes unsynchronized with the specified period), the level of the FRAME SYNC signal is switched from a high (H) level to a low (L) level at the respective EFM frame unit.

In this regard, it is to be understood that, in the case of the reference rotation speed (1X), the length (period) of one EFM frame is 136 μsec, and 98 EFM frames form one subcode frame.

This FRAME SYNC signal is inputted into the control means 13, and it is used for detecting the end of the HF signal.

Further, a SUBQ DATA signal is inputted into the control means 13 from the CD servo controller 21.

This SUBQ DATA signal is a signal which represents Q data in the subcode data.

The subcode includes eight type data represented by P, Q, R, S, T, U, V and W. One EFM frame includes a subcode of one byte in which each of P–W data is recorded with one bit, respectively.

In this connection, because each of P–W data is comprised of one bit, respectively, and one subcode frame is comprised of 98 EFM frames, there are a total of 98 bits for each P–W data in one subcode frame. However, because the first two EFM frames are used for the SYNC pattern (synchronization signal), there are actually 96 bits for each P–W data.

Next, FIG. 14 is a chart showing the format of the 96 bits of Q data. The CONTROL given by Q1–Q4 (4 bits) shown in this drawing is used to discriminate normal data or audio data.

Further, the ADDRESS given by Q5–Q8 (4 bits) represents the contents of the data in Q9–Q80 (72 bits).

Further, the CRC (Cyclic Redundancy Code) comprised of Q81–Q96 (16 bits) is used to detect errors (to judge whether or not the data is wrong).

Furthermore, from this Q data it is possible to obtain information such as the absolute time information on the optical disc 2, the information of the present track, lead-in and lead-out, the music number, and a TOC (Table of Contents) recorded in the lead-in area.

The control means 13 obtains such information from the Q data and then carries out predetermined operations.

Further, the SUBCODE-SYNC signal is inputted into the control means 13 from the CD servo controller 21.

Figure 15:
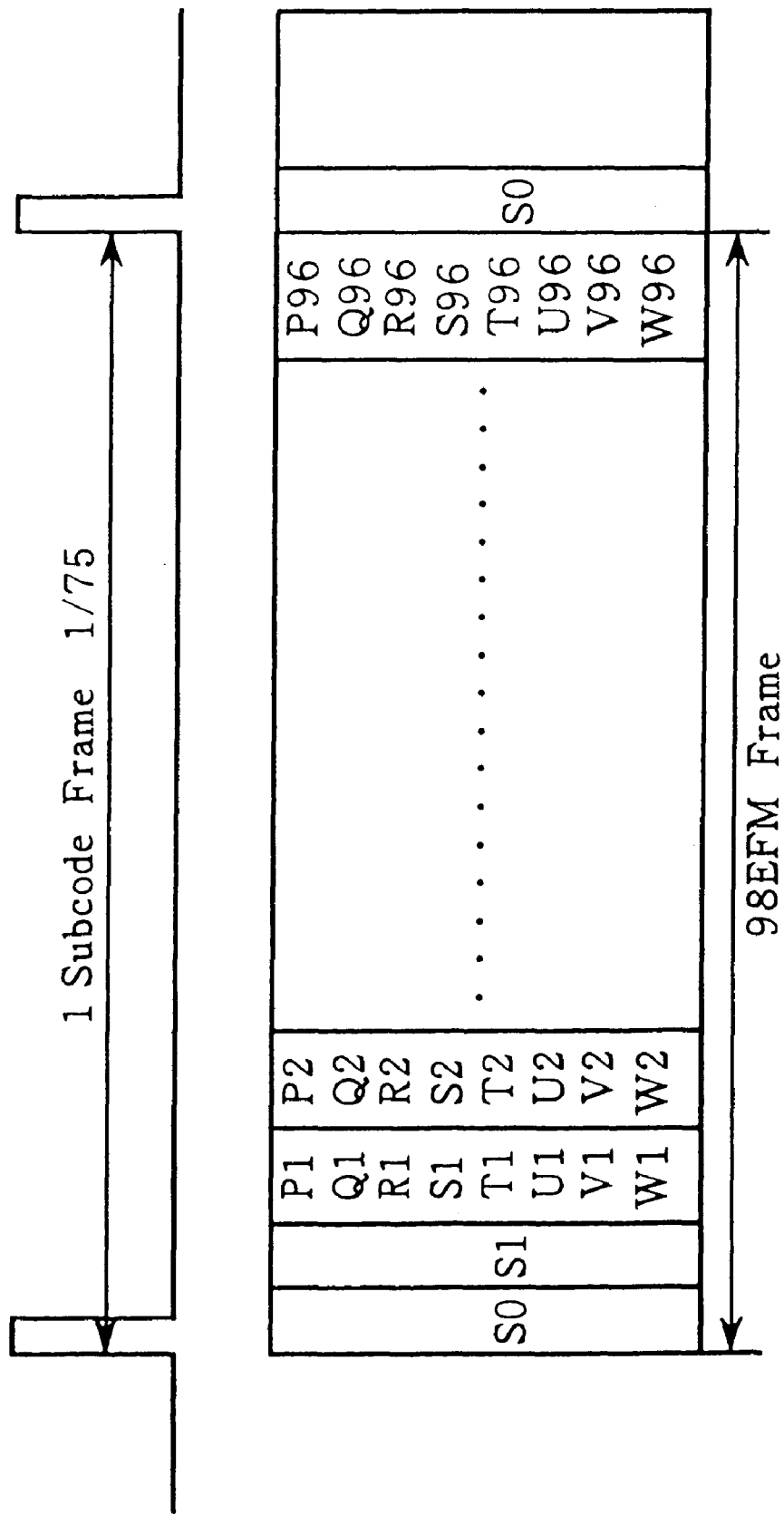
FIG. 15 is a chart which shows one subcode frame.

Now, as shown in FIG. 15, there are 98 bytes of subcode data in 98 EFM frames, and as mentioned above, the SYNC pattern (synchronization signal) is recorded in the two bytes which form the first two EFM frames, namely, S0 and S1.

When this SYNC pattern is detected, the CD servo controller 21 generates a pulse and then outputs it. Namely, a pulse is generated for every subcode frame (98 EFM frames) and then it is outputted. The signal which is formed by this pulse is the SUBCODE-SYNC signal. Further, the SYNC pattern is outputted 75 times every second in the case of the reference rotation speed (1X).

Further, in the CD servo controller 21, the Q data is renewed after the SUBCODE-SYNC signal pulse has been detected. Then, the renewed Q data is read into the control means 13.

(3) Focus Control, Tracking Control and Sled Control

In the PU drive and control signal generating circuit 18, a focus error (FE) signal, a tracking error (TE) signal and a sled error (SE) signal are respectively generated by carrying out addition and subtraction and the like on the detection signal from the split photodiode.

The focus error signal is a signal which represents the amount of displacement of the objective lens along the rotational axial direction away from the focus position (i.e., the amount of the displacement of the objective lens from the focus position) and the direction thereof.

The tracking error signal is a signal which represents the amount of displacement of the objective lens along a radial direction from the center of the track (Pre-groove) (i.e., the amount of the displacement of the objective lens from the center of the track) and the direction thereof.

Further, the sled error signal is a signal used for sled control, namely, used in the sled servo (i.e., the servo for moving the pick-up base of the optical pick-up 3). In other words, the sled error signal is a signal which represents the amount of the displacement of the optical pick-up 3 along a radial direction (i.e., the moving direction of the optical pick-up 3) from the target position (correct position) of the optical pick-up 3 and the direction thereof.

The focus error signal is inputted into the CD servo controller 21. Further, the tracking error signal is also inputted into the CD servo controller 21 and into the peak/bottom detection circuit 17, respectively, as described above. Furthermore, the sled error signal is also inputted into the CD servo controller 21.

Using these focus error signal, tracking error signal and sled error signal, the optical disc drive 1 carries out focus control, tracking control and sled control for a predetermined track.

During focus control, a focus PWM (Pulse Width Modulation) signal for controlling the driving of the actuator 4 along the rotational axial direction is generated in the CD servo controller 21. This focus PWM signal is a digital signal (continuous pulse).

The focus PWM signal is inputted into the PWM signal smoothing filter 7 from the CD servo controller 21 and undergoes smoothing in the PWM signal smoothing filter 7, namely, the focus PWM signal is converted into a control voltage (control signal), and it is then inputted into the driver 6. Then, based on such control voltage, the driver 6 applies the focus signal (predetermined voltage) to the actuator 4 to drive the actuator 4 in the rotational axial direction (focus direction).

In this case, the CD servo controller 21 adjusts the pulse width (duty ratio) of the focus PWM signal so that the level of the focus error signal becomes zero (i.e., the level is reduced as much as possible), and reverses the code of the focus PWM signal (pulse/minus sign). In this way, the objective lens of the optical pick-up 3 is positioned at the focus position. Namely, the focus servo is engaged.

Further, during tracking control, a tracking PWM signal for controlling the driving of the actuator 4 along the radial direction is generated in the CD servo controller 21. This tracking PWM signal is also a digital signal (continuous pulse).

The tracking PWM signal is inputted into the PWM signal smoothing filter 7 from the CD servo controller 21 and undergoes smoothing in the PWM signal smoothing filter 7, namely, the tracking PWM signal is converted into a control voltage (control signal), and it is then inputted into the driver 6. Then, based on such control voltage, the driver 6 applies the tracking signal (predetermined voltage) to the actuator 4 to drive the actuator 4 in the radial direction (tracking direction).

In this case, the CD servo controller 21 adjusts the pulse width (duty ratio) of the tracking PWM signal so that the level of the tracking error signal becomes zero (namely, the level is reduced as much as possible), and reverses the code of the tracking PWM signal (pulse/minus sign). In this way, the objective lens of the optical pick-up 3 is being positioned at the center of the track (Pre-groove). Namely, the tracking servo is engaged.

Further, during the sled control, a sled PWM signal for controlling the driving of the sled motor 5 is generated in the CD servo controller 21. This sled PWM signal is also a digital signal (continuous pulse).

The sled PWM signal is inputted into the PWM signal smoothing filter 7 from the CD servo controller 21 and undergoes smoothing in the PWM signal smoothing filter 7, namely, the sled PWM signal is converted into a control voltage (control signal), and it is then inputted into the driver 6. Then, based on such control voltage, the driver 6 applies the sled signal (predetermined voltage) to the sled motor 5 to rotationally drive the sled motor 5.

In this case, the CD servo controller 21 adjusts the pulse width (duty ratio) of the sled PWM signal so that the level of the sled error signal becomes zero (i.e., to reduce the level as much as possible), and reverses the code of the sled PWM signal (pulse/minus sign). In this way, the pick-up base of the optical pick-up 3 is positioned at the target position (correct position). Namely, the sled servo is engaged.

Further, in addition to tracking control, the tracking error signal is also used, for example, to control the movement of the optical pick-up 3 toward a predetermined track (target track) of the optical disc 2 (i.e., to control track jump operations).

(4) Track Jump Control (Control for Movement of Optical Pick-up)

In the optical disc drive 1, when the optical pick-up 3 is to be moved to a target track from the present position immediately, that is when the objective lens 3 is to be moved to the target track, a track jump control is carried out. In this track jump control, the sled motor 5 and the actuator 4 of the optical pick-up moving mechanism are respectively driven under control to carry out a rough search, a fine search and a combination thereof to move the objective lens of the optical pick-up 3 to the target track.

Figure 16:
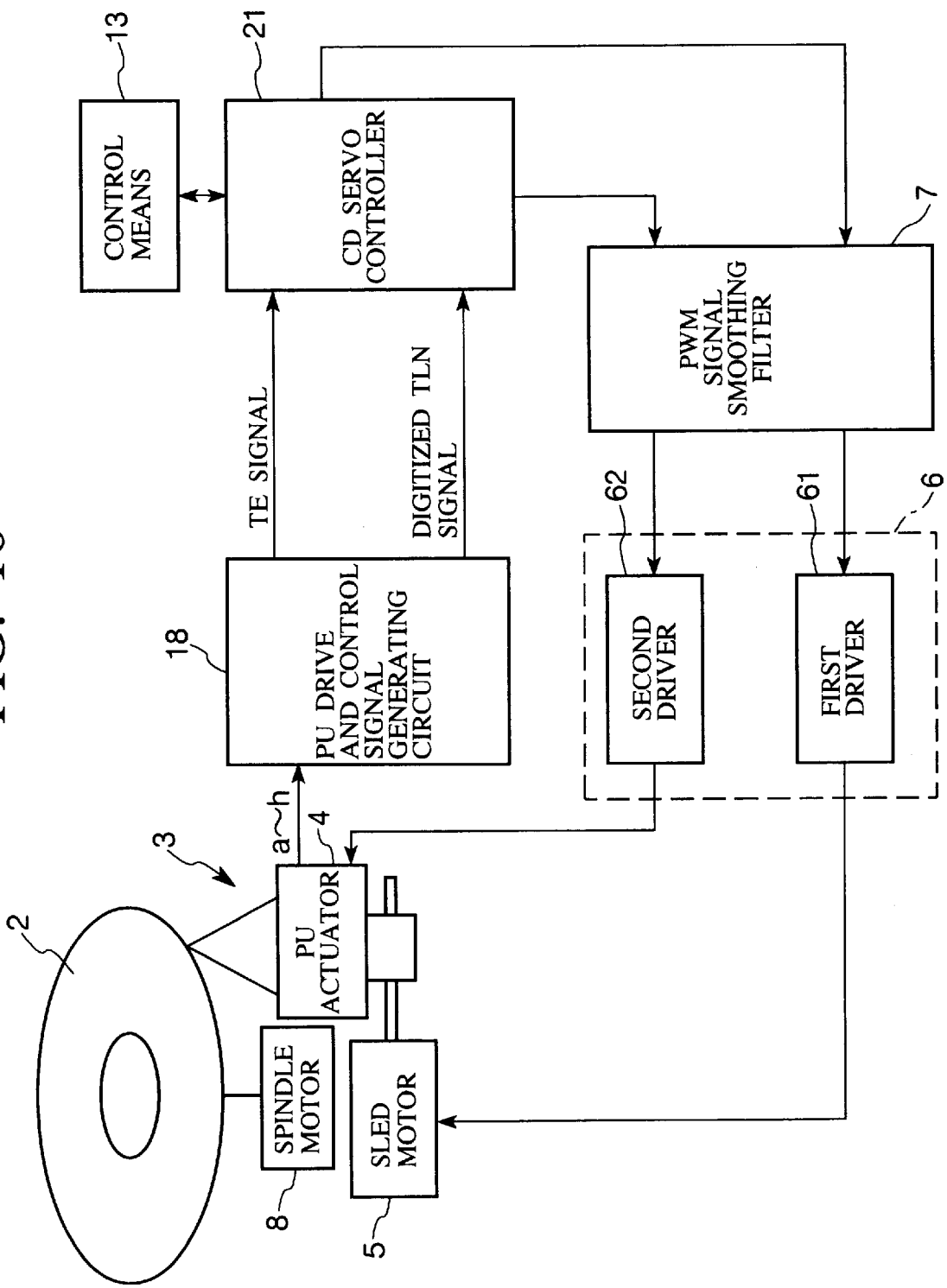
FIG. 16 is a block diagram of a circuit (including main components of FIG. 2) by which a track jump control is carried out in the optical disc drive according to the present invention.

FIG. 16 is a block diagram of a circuit (including main components of FIG. 2) by which a track jump control is carried out in the optical disc drive according to the present invention.

As shown in the drawing, detected signals a, b, c, d, e, f, g and h from the photodiode of the optical pick-up are respectively inputted into the pick-up drive and control signal generating circuit 18. In the pick-up drive and control signal generating circuit 18, addition and subtraction are performed for the detected signals a–h to produce a tracking error signal (hereinafter, referred to as "TE" signal) and a track loss signal (hereinafter, referred to as "TLN" signal).

The TE signal and TLN signal are then inputted into the CD servo controller 21. This CD servo controller supplies a driving signal to the driver 6 based on the TE signal and TLN signal.

The driver 6 is composed of a first driver 61 and a second driver 62. The first driver 61 supplies a control signal to drive the sled motor 5, and the second driver 62 supplies a control signal to drive the actuator 4.

When a track jump control is to be carried out, the CD servo controller 21 grasps the radial direction of the optical pick-up (objective lens) 3 relative to the optical disc 2 and the moving direction of the optical pick-up 3 based on the TE signal (S1) generated in the pick-up drive and control signal generating circuit 18 to move the optical pick-up 3 (objective lens) to the target track.

In this case, if the number of tracks from the present track to the target track (hereinafter, referred to as "the number of passing tracks") is relatively large, that is the number exceeds a predetermined reference value (threshold value), a rough search is carried out. In the case where the optical pick-up 3 has not yet been positioned at the target track at the time when the rough search is completed, a fine search is then carried out. The optical pick-up 3 is moved to the target track by this fine search.

On the other hand, if the number of passing tracks is relatively small, that is the number is equal to or less than a predetermined reference value (threshold value), a fine search is carried out. The optical pick-up 3 is moved to the target track properly. Hereinbelow, a description is made with regard to the rough search and the fine search.

In the rough search, the CD servo controller 21 send a driving signal to the first driver 61 while grasping the radial position of the optical pick-up (objective lens) 3 based on the TE signal. In this way, a control signal is fed to the sled motor 5 from the first driver 61, so that the sled motor 5 is driven to move the optical pick-up body in the radial direction. Namely, by the movement of the optical pick-up body, the optical pick-up 3 is moved to the target track. Hereinbelow, an explanation will be made with regard to the rough search with reference to the schematic drawing shown in FIG. 17.

Figure 17:
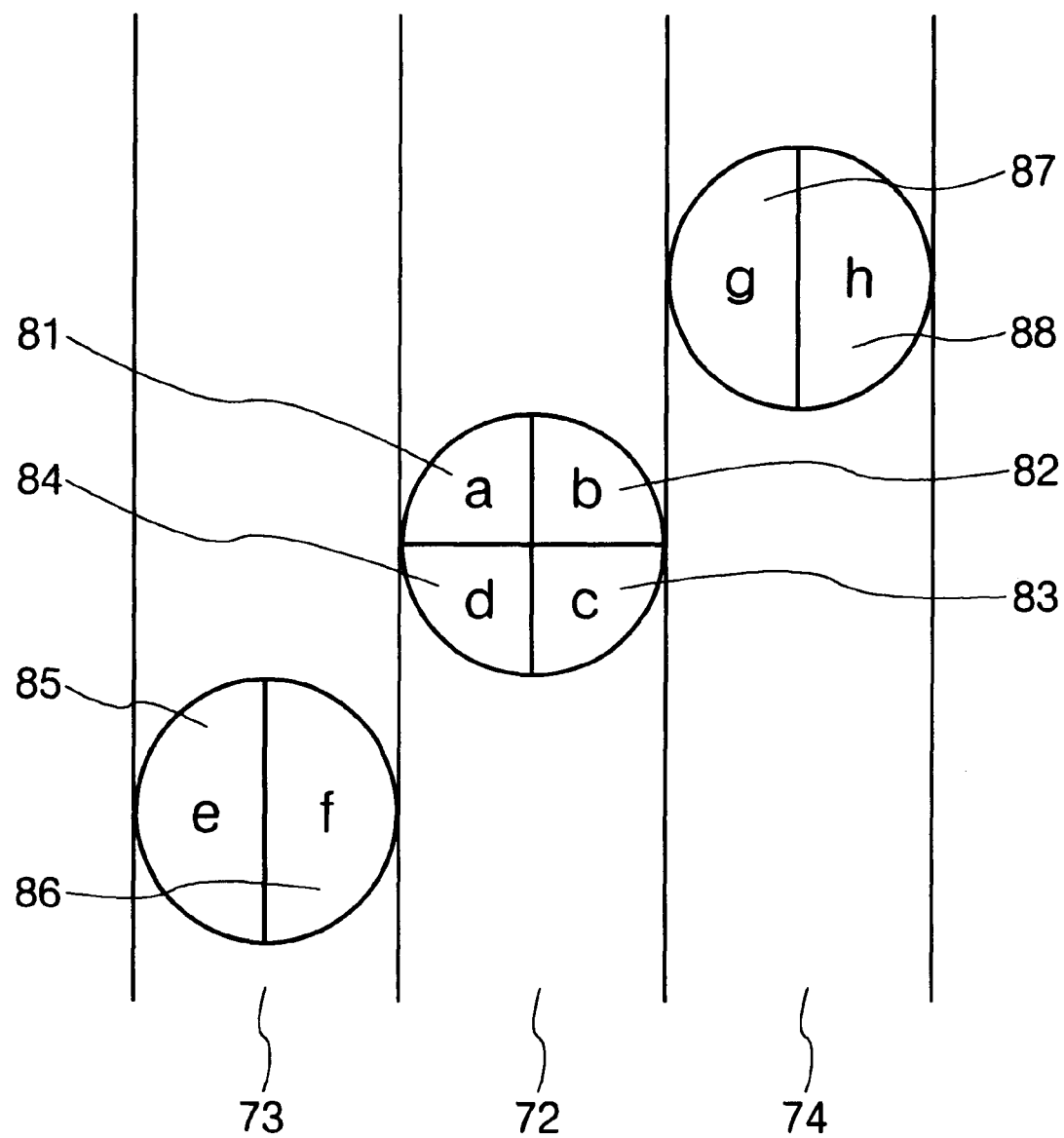
FIG. 17 shows the positional relationship between the split photodiode and the reflected laser beams in the optical disc drive according to the present invention.

FIG. 17 shows a positional relationship between the split photodiode and the reflected laser beam. In this connection, it is to be noted that FIG. 17 shows the state where a main beam among the main beam and two sub-beams is emitted to a pre-groove 72.

As shown in the drawing, in this optical disc drive 1, a DPP (differential Push Pull) method is used, in which a main beam is emitted to a pre-groove 72 formed in an optical disc 2, one sub-beam is emitted to one land 73 adjacent to the pre-groove 72 and the other sub-beam is emitted to the other land 74 adjacent to the pre-groove 72.

The reflected beam reflected from the pre-groove 72 is received at the light receiving portions 81, 82, 83 and 84 of the split photodiode, and then detected signals a, b, c and d each having a level corresponding to the quantity of the received light are outputted from the respective light receiving portions 81, 82, 83 and 84.

Further, the reflected light of the sub-beam from the land 73 is received at the light receiving portions 85 and 86 of the split photodiode, and then detected signals e and f each having a level corresponding to the quantity of the received light are outputted from the light receiving portions 85 and 86, respectively.

Furthermore, the reflected light of the sub-beam from the land 74 is received at the light receiving portions 87 and 88 of the split photodiode, and then detected signals e and f each having a level corresponding to the quantity of the received light are outputted from the light receiving portions 85 and 86, respectively.

The TE signal is represented by the following Equation (1). Here, k is a constant.

$$TE\ \text{signal} = \{(a+d)-(b+c)\} - k\{(e+g)-(f+h)\}$$  Equation (1)

When the main beam is positioned at the center of the pre-groove 72 or the center of each land 73, 74, the above Equation is $\{(a+d)-(b+c)\} = k\{(e+g)-(f+h)\}$, so that the level of the TE signal becomes zero (zero level).

When the rough search is to be carried out, the sled motor 5 is driven to move the optical pick-up 3 in the radial direction, so that the laser beam emitted from the optical pick-up 3 traverse the pre-groove and land alternately such as an order of pre-groove, land, pre-groove. The reflectance of the laser beam of the pre-groove is lower than that of the land, the quantity of the light reflected on the land is less than the quantity of the light reflected on the pre-groove. For this reason, the TE signal given by the Equation (1) becomes a signal having a waveform shown in FIG. 1 in accordance with the displacement in the radial direction, and a wave of one wavelength (one cycle) is produced every time upon passing of the optical pick-up above one pre-groove, that is one track.

Therefore, by counting the number of peaks or bottoms of the TE signal with a counter (not shown in the drawing) incorporated in the CD servo controller 21, it is possible to know the number of pre-grooves, that is the number of tracks above which the optical pick-up 3 has passed, thereby making it possible to move the optical pick-up 3 to the target track.

Figure 18:
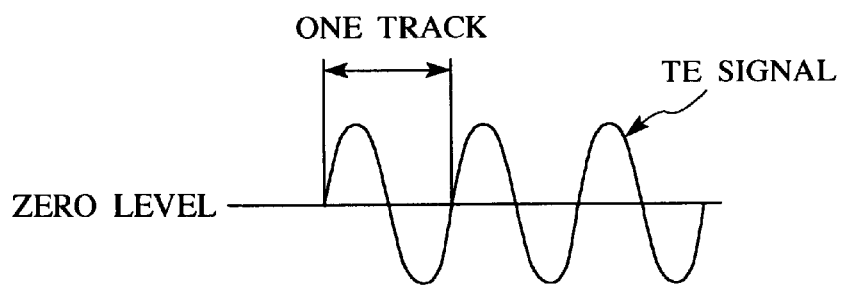
FIG. 18 shows one example of a waveform of a tracking error signal.

For example, when the optical pick-up is to be moved for 1000 tracks through the rough search, the sled motor 5 is driven to move the optical pick-up 3 and at the same time the number of peaks and bottoms of the TE signal shown in FIG. 18 is counted, and then the sled motor 5 is stopped when the counted number reaches at 1000.

Next, an explanation will be made with regard to the fine search. In the fine search, the CD servo controller 21 send a driving signal to the second driver 62 while grasping the radial position of the optical pick-up (objective lens) 3 based on the TLN signal and the moving direction of the optical pick-up (objective lens) 3 based on the TE signal (phase difference between the TE signal and the TLN signal). In this way, a control signal is fed to the actuator 4 from the second driver 62, so that the actuator 4 5 is driven to move the objective lens in the radial direction. Further, the CD servo controller 21 controls the driving of the sled motor 5 through the first driver 61 such that the optical pick-up body follows the objective lens. In this way, the optical pick-up 3 is moved to the target track.

The TLN signal is represented by the following Equation (2). Here, k' is a constant.

$$TLN\ \text{signal} = \{(a+b+c+d) - k'(e+f+g+h)\}$$  Equation (2)

When the main beam is positioned at the center of the pre-groove 72 as shown in FIG. 17, the value of the first term (a+b+c+d) at the right side of the equation becomes maximum, while the value of the second term (e+f+g+h) becomes minimum, so that the level of the TLN signal becomes maximum.

As the main beam is being far away from the center of the pre-groove, the level of the TLN signal becomes small. When the main beam becomes positioned at the center of the land, the level of the TLN signal becomes minimum.

Figure 19:
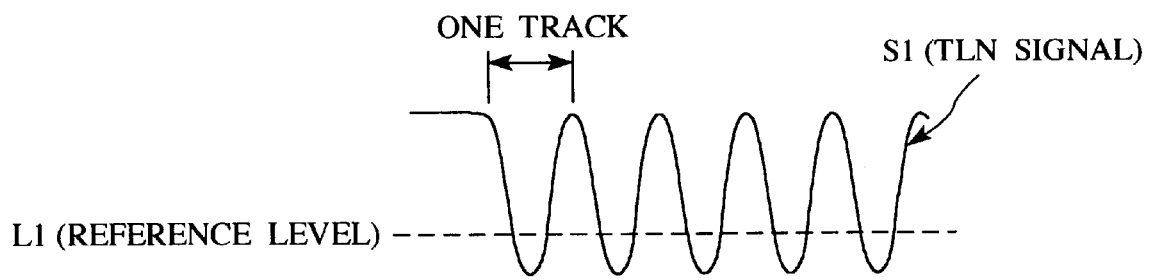
FIG. 19 shows one example of a waveform of a track loss signal (TLN signal).

Therefore, when the optical pick-up 3 is moved into the radial direction, the TLN signal S1 becomes a signal having a waveform which is changed (oscillated) substantially in a predetermined cycle as shown in FIG. 19. In this TLN signal S1, a wave of one wavelength (one cycle) is produced every time upon passing of the optical pick-up 3 above one pre-groove, that is one track. Namely, since the number of bottoms (waves) of the TLN signal S1 corresponds to the number of tracks (the number of pre-grooves) above which the optical pick-up 3 has passed. Therefore, by counting the number of peaks by a counter (not shown in the drawing) incorporated in the CD servo controller 21, it is possible to know the number of pre-grooves (the number of tracks) above which the optical pick-up 3 has passed, thereby making it possible to move the optical pick-up 3 to the designated track.

For example, when the optical pick-up 3 is to be moved for 50 tracks through the fine search, the actuator 4 and the sled motor 5 are driven to move the optical pick-up 3, and at the same time the number of peaks of the TLN signal shown in FIG. 19 is counted, and then the actuator 4 and the sled motor 5 are stopped such that the counted value becomes 50.

(5) Rotation Number Control (Rotation Speed Control)

In the optical disc drive 1, the rotation number (rotation speed) of the spindle motor 8 is controlled during recording or playback for instance so that the linear velocity becomes constant. The rotation number control can be achieved by the methods include a method using a WOBBLE PWM (Pulse Width Modulation) signal, namely, a spindle servo (WOBBLE servo) which uses the WOBBLE signal; a method using an FG PWM signal, namely, a spindle servo (FG servo) which uses an FG signal; and a method using an EFM PWM signal, namely, a spindle servo (EFM servo) which uses the EFM signal. These will be described below in the order mentioned above.

The WOBBLE PWM signal is a signal for controlling the spindle motor, and it is generated by the WOBBLE servo controller 22. The WOBBLE PWM signal is a digital signal (continuous pulse) having a level of 0–5V.

This WOBBLE PWM signal is inputted into the PWM signal smoothing filter 12 from the WOBBLE servo controller 22 and undergoes smoothing in the PWM signal smoothing filter 12, namely, the WOBBLE PWM signal is converted into a control voltage (control signal), and it is then inputted into the driver 11. Then, based on such control voltage, the driver 11 rotationally drives the spindle motor 8.

In this case, the WOBBLE servo controller 22 adjusts the pulse width (duty ratio) of the WOBBLE PWM signal so that the frequency (period) of the WOBBLE signal becomes the target value (e.g., 22.05 kHz at the reference rotation speed (1X)). In this way, the spindle servo is engaged to set the rotation number (rotation speed) of the spindle motor 8 at the target value.

The FG PWM signal is a signal for controlling the spindle motor, and it is generated by the control means 13. The FG PWM signal is a digital signal (continuous pulse) having a level of 0–5V.

This FG PWM signal is inputted into the PWM signal smoothing filter 12 from the control means 13 and undergoes smoothing in the PWM signal smoothing filter 12, namely, the FG PWM signal is converted into a control voltage (control signal), and it is then inputted into the driver 11. Then, based on such control voltage, the driver 11 rotationally drives the spindle motor 8.

On the other hand, a FG (Frequency Generator) signal corresponding to the rotation number (rotation speed) of the spindle motor 8 is outputted from the Hall element 9. This FG signal is digitized by the FG signal digitization circuit 23 and such a digitized signal is then inputted into a frequency measurement (period measurement) section (not shown in the drawings) of the control means 13.

In the frequency measurement section of the control means 13, the frequency (period) of the FG signal is measured based on the clock signal from the clock 32. Then, the control means 13 adjusts the pulse width (duty ratio) of the FG PWM signal so that the frequency (period) of the FG signal becomes the target value. In this way, the spindle servo is engaged to set the rotation number (rotation speed) of the spindle motor 8 at the target value.

The EFM PWM signal is a signal for controlling the spindle motor, and it is generated by the CD servo controller 21. The EFM PWM signal is a digital signal (continuous pulse) having a level of 0–5V level.

This EFM PWM signal is inputted into the PWM signal smoothing filter 12 from the CD servo controller 21 and undergoes smoothing in the PWM signal smoothing filter 12, namely, the EFM PWM signal is converted into a control voltage (control signal), and it is then inputted into the driver 11. Then, based on such control voltage, the driver 11 rotationally drives the spindle motor 8.

In this case, the CD servo controller 21 adjusts the pulse width (duty ratio) of the EFM signal so that the EFM signal, that is a period of a predetermined pulse selected from the 3T–11T period pulses becomes the target value in anywhere on the optical disc. In this way, the spindle servo is engaged to set the rotation number (rotation speed) of the spindle motor 8 at the target value.

Hereinbelow, the operations in a fine search will be described in details. As described above, when the fine search it to be carried out, the radial position of the optical pick-up 3 is grasped by counting the number of bottoms of the TLN signal shown in FIG. 19 so that the optical pick-up 3 can be moved to the target track.

In this case, as described above, a reference level L1 is preset. Then, the TLN signal is digitized by comparing the level of the TLN signal S1 with the reference level L1. Then, by counting the number of pulses of the digitized TLN signal, it is possible to detect how many tracks have been traversed during the fine search (track jump).

(6) Eccentric Component Producing Operation

As described hereinbelow, in this optical disc drive 1, an amplitude adjustment for the tracking error signal and an offset adjustment for the TLN signal are carried out, respectively. When these adjustments are to be carried out, it is required to hold peaks and bottoms of the tracking error signal and the TLN signal stably.

In order to stably hold the peaks and bottoms of the tracking error signal and TLN signal, it is preferred that the interval of the adjacent waves (peaks or bottoms) is narrow and that the interval of the adjacent waves (peaks or bottoms) of the TLN signal is narrow. In this case, in the case of optical discs having larger eccentric components, the interval between the waves of the tracking error signal and the interval between the waves of the TLN signal become narrow.

However, among various types of optical discs, there is one having less eccentric component. For example, CD-R has less eccentric component. In the case of such an optical disc having less eccentric component, the interval of the waves of the tracking error signal and the interval of the TLN signal are relatively wide. Therefore, it is difficult to hold the peaks and bottoms of the tracking error signal and the TLN signal stably, thus leading to poor accuracy in the amplitude adjustment and the offset adjustment.

For this reason, in the optical disc drive 1 of the present invention, when the amplitude adjustment of the tracking error signal and/or the offset adjustment of the TLN signal are to be carried out after the focus servo has been engaged, the tracking actuator is actuated to perform a beam scanning in the radial direction of the disc so that the interval between the waves of the tracking error signal and the interval between the waves of the TLN signal become narrow, and the amplitude adjustment and the offset adjustment are carried out under this state.

Figure 20:
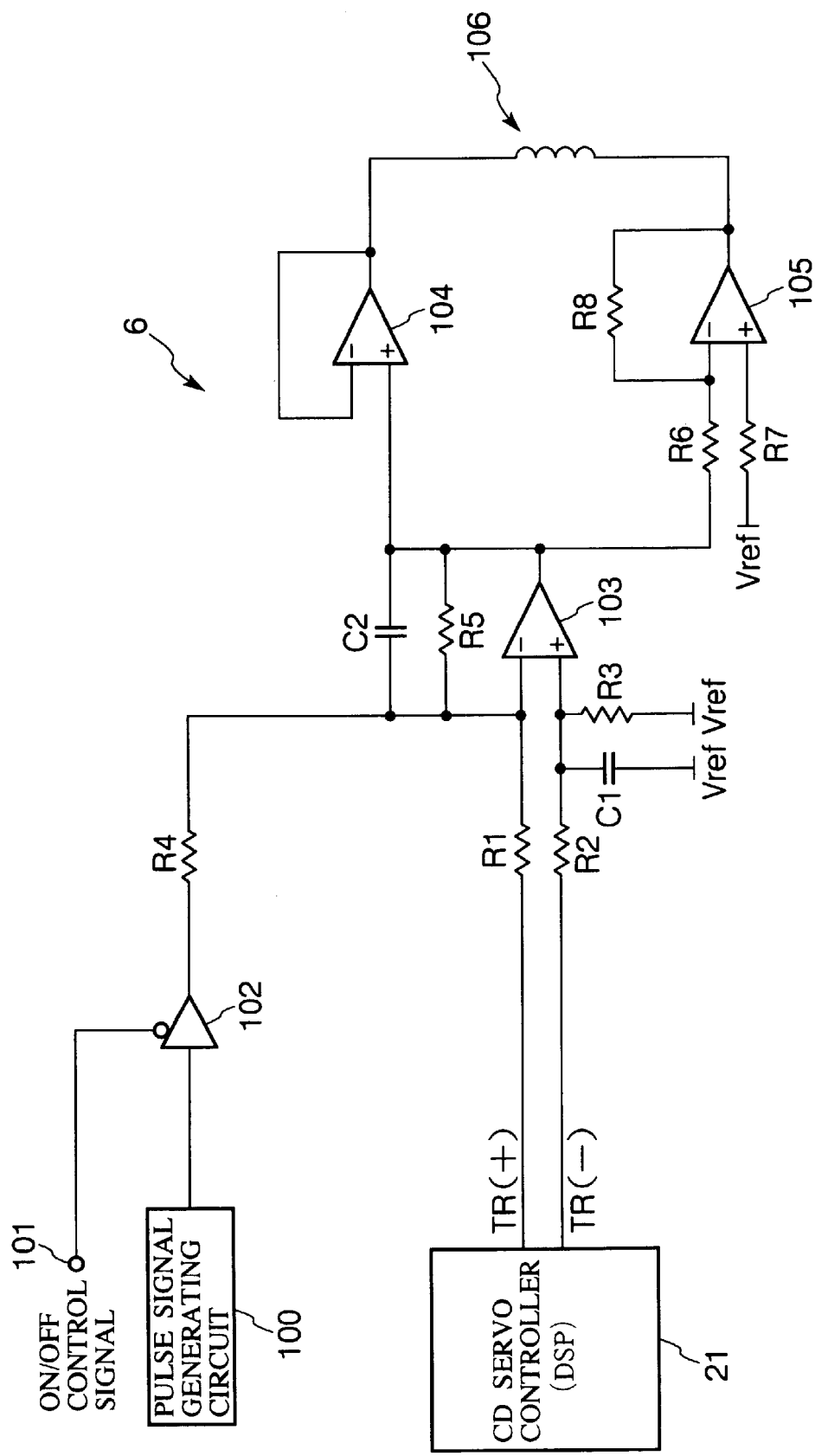
FIG. 20 is a circuit diagram of an eccentric component generating apparatus provided in the optical disc drive according to the present invention.

FIG. 20 is a circuit configuration of an eccentric component generating apparatus provided in the optical disc drive 1.

In FIG. 20, the eccentric component generating apparatus is generally comprised of a pulse signal generating circuit 100 which generates a predetermined pulse signal, a three-state buffer 102 which outputs a predetermined pulse signal supplied from the pulse signal generating circuit 100 when the amplitude adjustment of the tracking error signal and the offset adjustment of the TLN signal are to be carried out after the focus servo has been engaged, and a driving system for the tracking actuator.

An enable terminal of the three-state buffer 102 is connected to the control means 13. When the amplitude adjustment of the tracking error signal and the offset adjustment of the TLN signal are to be carried out by the control means 13 after the focus servo has been engaged, the three-state buffer 102 is changed into an enable state, thereby a pulse signal is outputted from the pulse signal generating circuit 100 through the three-state buffer 102.

On the other hand, the driving system of the tracking actuator is generally comprised of a CD servo controller 21 which is constructed from e.g. a DSP (Digital Signal Processor) which outputs a first tracking PWM signal (TR (+)) for carrying out a beam scanning toward the outer circumferential direction of the optical disc and a second tracking PWM signal (TR(-)) for carrying out a beam scanning toward the inner circumferential direction, a first differential amplifier 103 for driving a tracking actuator coil 106, a second differential amplifier (buffer) 104 and a third differential amplifier 105.

An output terminal of the CD servo controller 21 which outputs the first tracking PWM signal is connected to an inverting input terminal of the first differential amplifier 103 through a resister R1. An output terminal of the CD servo controller 21 which outputs the second tracking PWM signal is connected to a non-inverting input terminal of the first differential amplifier 103 through an integrating circuit which is constructed from resistors R2, R3 and a capacitor C1. An output terminal of the differential amplifier 103 is connected to a non-inverting terminal of the second differential amplifier 104, and it is also connected to an inverting input terminal of the third amplifier 105 through a resister R6. Further, an output of the first differential amplifier 103 is also returned to the inverting input terminal in a feedback manner through an integrated circuit which is constructed from resistors R1, R5 and a capacitor C2.

An output terminal of the second amplifier 104 is connected to its inverting input terminal in a feedback manner as well as connected to one end of the tracking actuator coil 106. An output terminal of the third differential amplifier 105 is connected to its inverting input terminal in a feedback manner through a resister R8 and it is also connected to the other end of the tracking actuator coil 106. Further, a reference voltage (Vref) is applied to the non-inverting input terminal of the third amplifier 105 through a resistor R7.

In connection with the driving system for the tracking actuator described above, the output terminal of the three-states buffer 102 is connected to the non-inverting input terminal of the first differential amplifier 103 so that the pulse signal fed from the pulse signal generating circuit 100 is supplied to the non-inverting input terminal of the first differential amplifier 103 when the amplitude adjustment of the tracking error signal and the offset adjustment of the TLN signal are to be carried out by the control means 13 after the focus servo has been engaged.

In this regard, it is to be noted that the resisters R2, R3, the capacitor C1, the resisters R1, R5, the capacitor C2 and the differential amplifier 103 are also used to realize a part of the PWM signal smoothing circuit 7 (which is a circuit for smoothing the first tracking PWM signal and the second tracking PWM signal).

Hereinbelow, an explanation is made with regard to the operation of the eccentric component generating apparatus. In this eccentric component generating apparatus, when for example a beam scanning toward the outer circumferential direction of an optical disc is to be carried out, the CD servo controller 21 sets the pulse width of the first tracking PWM signal (TR(+)) so as to be relatively wider than the pulse width of the second tracking PWM signal (TR(-)), and then supplies these PWM signals to the inverting input terminal and the non-inverting input terminal of the first differential amplifier 103, respectively. In this way, the minus difference at the differential amplifier 103 becomes large, and an output of such a state is supplied to the tracking actuator coil 106 through the second and third amplifiers 104, 105, so that the tracking actuator coil 106 is driven so as to perform a beam scanning toward the outer circumferential direction of the disc.

On the other hand, when a beam scanning toward the inner circumferential direction is to be performed, the CD servo controller 21 sets the pulse width of the second tracking PWM signal (TR(-)) so as to be relatively wider than the pulse width of the first tracking PWM signal (TR(-)), and then supplies these PWM signals to the first differential amplifier 103, respectively. In this way, the plus difference at the differential amplifier 103 becomes large, and an output of such a state is supplied to the tracking actuator coil 106 through the second and third amplifiers 104, 105, so that the tracking actuator coil 106 is driven so as to perform a beam scanning toward the inner circumferential direction of the disc.

Figure 21:
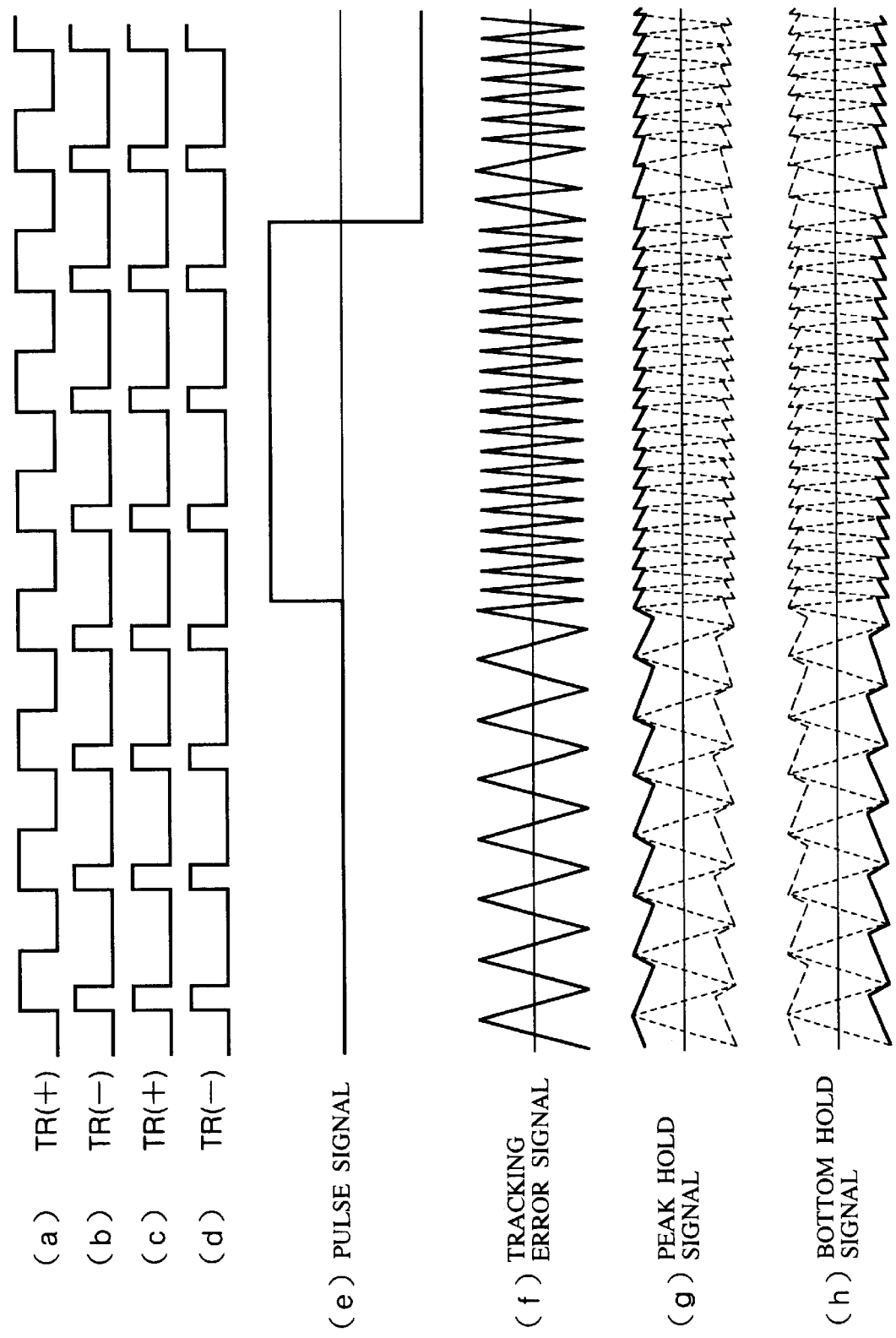
FIG. 21 is a timing chart for explaining the operations of the eccentric component generating apparatus.

The above described driving control for the tracking actuator is a driving control which is normally carried out at a seek time or the like. However, when the amplitude adjustment for the tracking error signal and the offset adjustment for the TLN signal are to be carried out after a focus servo has been engaged, the CD servo controller 21 produces first and second tracking PWM signals which have the same pulse width and the same phase, respectively, as shown in FIG. 21(c) and FIG. 21(d), and then supplies these signals to the first differential amplifier 103. Therefore, in this case, since there is no difference between the respective PWM signals at the first differential amplifier 103, the tracking actuator is brought into a stopped state.

Figure 30:
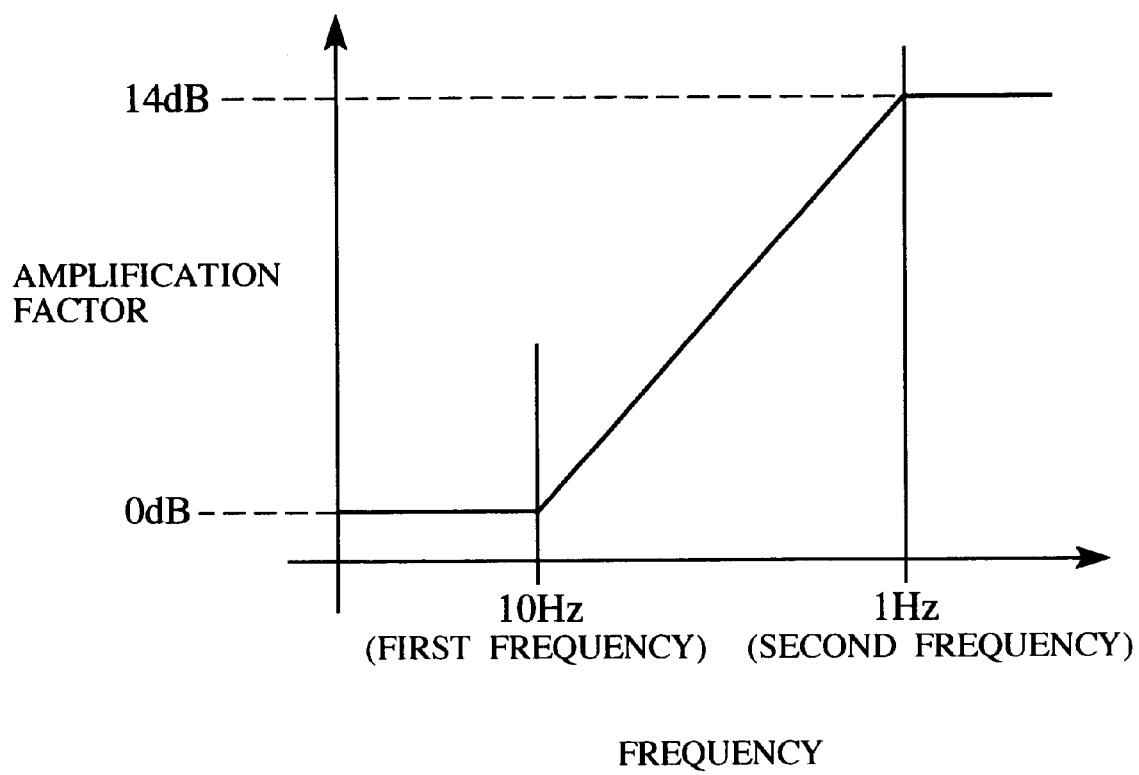
FIG. 30 is a graph which shows frequency characteristics of an amplification factor of a high booster filter used in the TLN signal generating apparatus according to the second embodiment.

Next, the control means 13 supplies ON/OFF control signal to the three-state buffer 102 through an input terminal 101 shown in FIG. 30, thereby making the three-state buffer 102 which is normally kept in a disable state to be turned into an enable state so that for example 48 Hz pulse signal as shown in FIG. 21(e) is supplied from the pulse signal generating circuit 100 to the inverting input terminal of the first differential amplifier 103. In this connection, it is to be noted that in FIG. 21(e) the zero level signal between the high level and the low level of the pulse signal which appears before the output of the pulse signal is an output of the three-state buffer 102 under the unstable condition (high impedance condition).

Accordingly, when a high level pulse signal is supplied to the inverting input terminal of the first differential amplifier 103, the signal level at the inverting input terminal becomes larger than the level of the second tracking PWM signal at the non-inverting input terminal, so that a minus difference is generated during the period of the high level of the signal. As a result, the tracking actuator coil 106 is driven by the output produced by the minus difference, so that the beam being emitted onto the disc is scanned toward the outer circumferential direction in a large degree.

On the other hand, when a low level pulse signal is supplied to the non-inverting input terminal of the first differential amplifier 103, the signal level at the non-inverting input terminal becomes smaller than the second tracking PWM signal at the non-inverting input terminal, so that a plus difference is generated during the period of the low level of the signal. As a result, the tracking actuator coil 106 is driven by the output produced by the plus difference, so that the beam which has been scanned toward the outer circumferential direction as described above is in turn scanned toward the inner circumferential direction in a large degree. These operations are repeated in a cycle of the pulse signal from the pulse signal generating circuit 100.

In accordance with the beam scanning control utilizing the pulse signal, the relatively wide interval of the adjacent waves of the tracking error signal is changed into a relatively narrow interval as shown in FIG. 21(f). Namely, since the beam is traversed onto the track (pre-groove and land) by this beam scanning, a component (eccentric component) corresponding to an eccentric component which would be caused by eccentricity in an optical disc is produced (see a portion of the waveform shown in FIG. 21(f) in which the interval between the adjacent waves is relatively narrow).

Further, though not shown in the drawings, the relatively wide interval of the adjacent waves of the TLN signal also becomes narrow in the same manner as the tracking error signal described above. Namely, since the beam is traversed onto the track (pre-groove and land) by this beam scanning, a component (eccentric component) corresponding to an eccentric component which would be caused by eccentricity in an optical disc is.

Therefore, not only in the case where a loaded optical disc has a large eccentric component but also in the case where a loaded optical disc has less or no eccentric component, it is possible to prevent undesired situation in which a waveform of the tracking error signal or the TLN signal is expanded (an interval between adjacent waves becomes wide).

Specifically, since the interval of adjacent waves becomes narrow as shown in FIG. 21(f), it is possible to stably hold peaks and bottoms of the tracking error signal and TLN signal in the peak/bottom detection circuit 17 as shown in FIG. 21(g) and FIG. 21(h). As a result, it becomes possible to accurately and reliably perform the offset adjustment for the TLN signal and the amplitude adjustment for the tracking error signal which will be described below in more details.

Although the above description was made with regard to the case where the beam is scanned toward the inner circumferential direction or the outer circumferential direction by driving the tracking actuator coil 106. However, in the present invention, it is also possible to control movement of the optical pick-up 3 toward inner and outer circumferential directions of an optical disc by driving the sled motor 3. For this purpose, the sled motor 5 is driven by the pulse signal described above, so that the same effect as described above can be obtained.

Further, in the present invention, it is also possible to construct the apparatus such that the beam scanning is carried out toward inner and outer circumferential directions of an optical disc by driving both the sled motor 5 and the tracking actuator coil 106 appropriately.

(7) Canceling Operation for Offset Component of TLN Signal

Normally, the TLN signal contains an offset component (direct current component). This offset component fluctuates due to various factors such as ambient temperature, deterioration resulted from elapse of time, tilting degree of an optical pick-up 3, loading condition of an optical disc and the like. Therefore, the TLN signal does not always fluctuate within a certain amplitude level with respect to the reference level.

Figure 22:
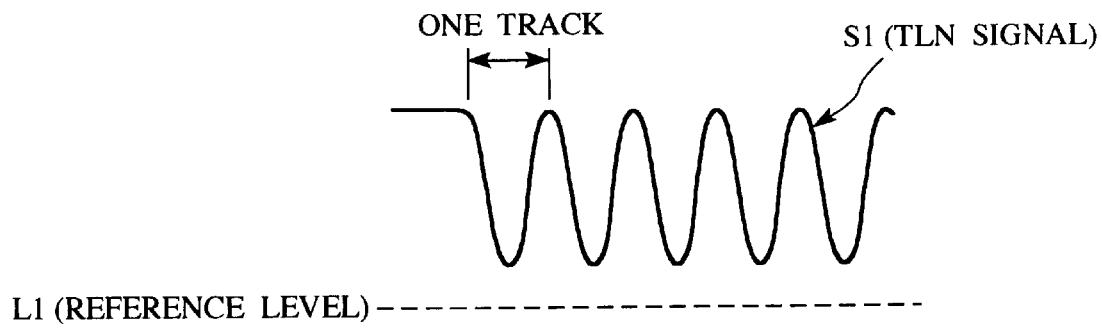
FIG. 22 shows a state in which the track loss signal (TLN signal) does not cross the reference level due to the presence of the offset component.

Specifically, when the offset component becomes large as shown in FIG. 22, the TLN signal S1 does not intersect the reference level L1. In such a case, it is not possible to digitize the TLN signal S1 accurately. With this result, it is no longer possible to count the number of the tracks above which the optical pick-up 3 has traversed. This makes it impossible to move the optical pick-up 3 to the target track. Namely, it is not possible for the optical pick-up 3 to carry out accurate track jump.

Figure 23:
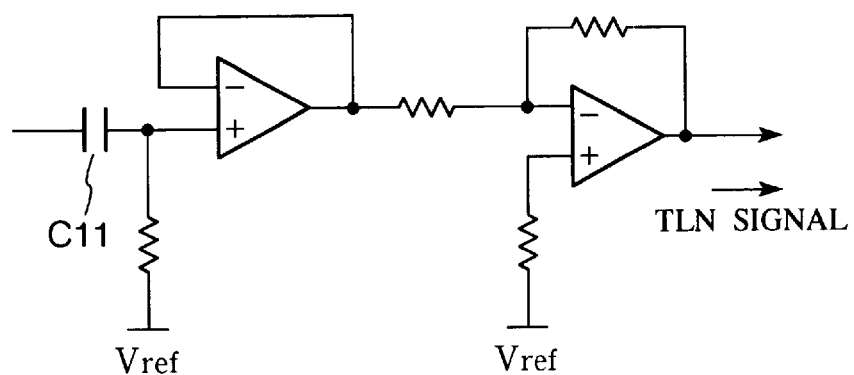
FIG. 23 shows a circuit configuration which eliminates a direct current component and amplifies an alternative current component.

In order to solve this problem, there is one approach in which a circuit shown in FIG. 23 is arranged at the input side of the TLN signal to eliminate the offset component. As shown in the drawing, in this circuit, the TLN signal S1 is amplified after an offset component contained in the TLN signal S1 has been eliminated using a capacitor C11 or the like. Therefore, it is possible for the TLN signal to have a large amplitude of which center lies in the reference level L1.

However, the circuit shown in FIG. 23 has poor response with respect to changes in output. Therefore, once the amplitude of the TLN signal fluctuates or changes, the influence of the change of the amplitude continues for a predetermined time.

For example, in the case of CD-R having a recorded portion in which data has been recorded and a non-recorded portion in which no data has yet been recorded, the amplitude of the TLN signal becomes large when the optical pick-up 3 passes above the recorded portion, while the amplitude thereof becomes small when the optical pick-up 3 passes above the non-recorded portion.

Figure 24:
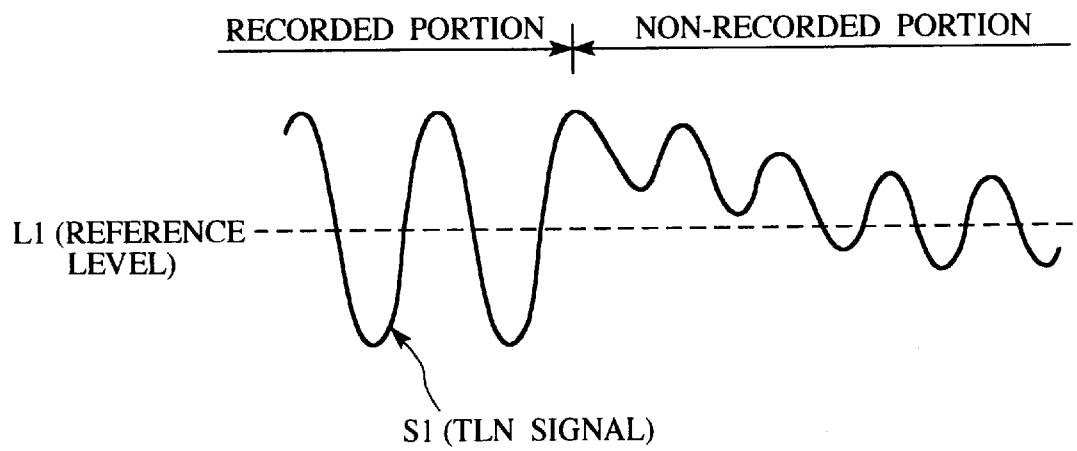
FIG. 24 shows changes in the output signal from the circuit shown in FIG. 23 which appears when the amplitudes of the TLN signal are changed in the circuit shown in FIG. 23.

Therefore, as shown in FIG. 24, when the optical pick-up 3 is moved from the recorded portion to the non-recorded portion, the TLN signal S1 fluctuates so that the center of the amplitude gradually approaches to the reference level. This gives rise to a problem in that the TLN signal S1 does not intersect the reference level L1 even though the optical pick-up 3 has actually traversed above tracks, thus leading to poor accuracy in the digitizing process. As a result, an error will be caused in the counted number of tracks above which the optical pick-up 3 has passed, so that there is a case that it is not possible to move the optical pick-up 3 to the target track accurately.

For these reasons, the optical disc drive 1 is provided with a TLN signal generating (producing) apparatus which generates (produces) a TLN signal from which an offset component is cancelled.

Figure 25:
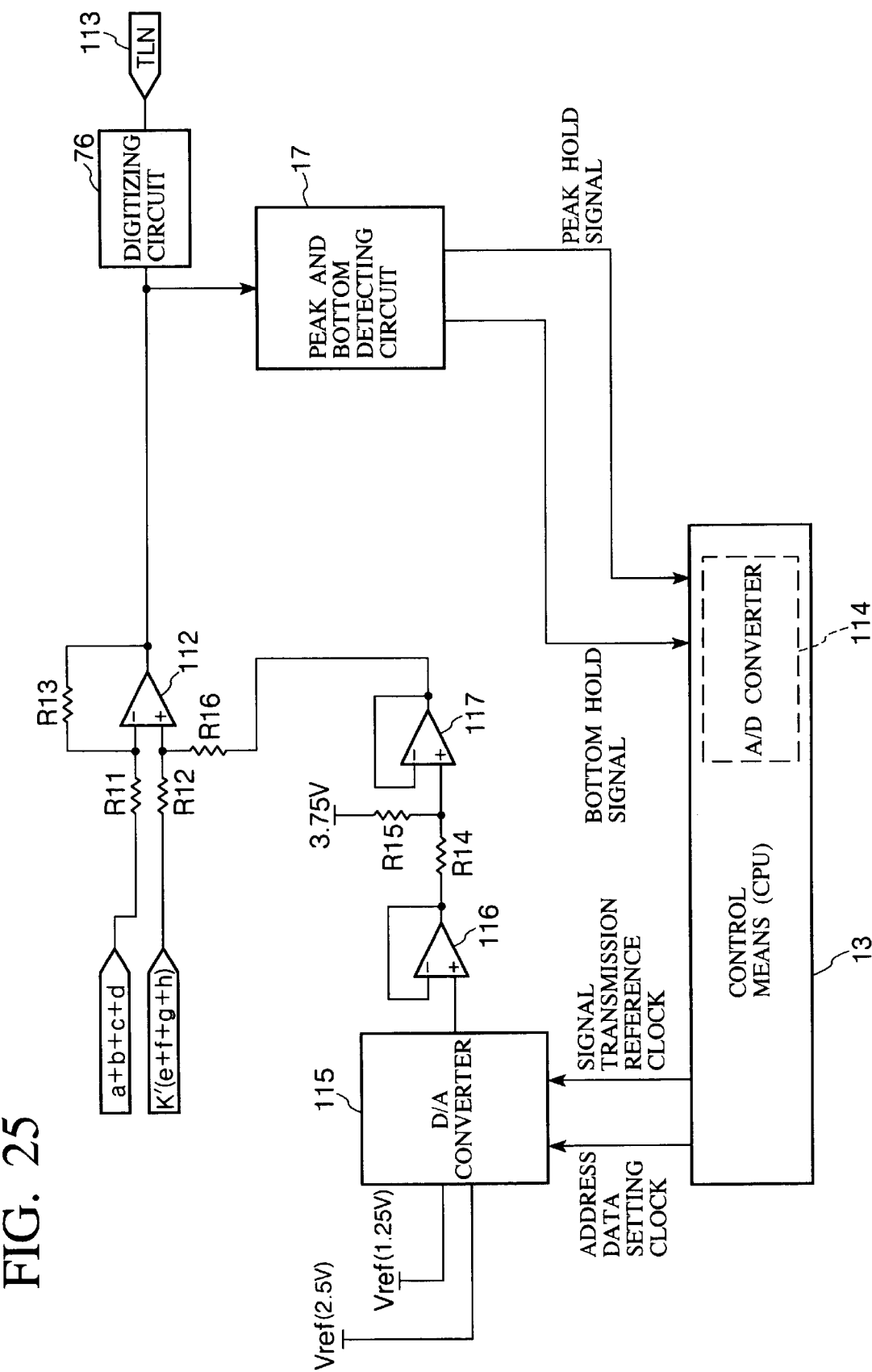
FIG. 25 shows a circuit configuration of a first embodiment of a TLN signal generating apparatus provided in the optical disc drive according to the present invention.

FIG. 25 is a block diagram which shows a first embodiment of the TLN signal producing apparatus used in the optical disc drive 1. In FIG. 25, the TLN signal producing apparatus is generally constructed from a first differential amplifier 112 which produces a TLN signal based on the difference of the amount of light between a main beam and two sub-beams, a peak and bottom detecting circuit 17 for detecting a peak value and a bottom value of the TLN signal fed from the differential amplifier 112, a D/A converter 115 for applying a reference voltage which is used to cancel the offset component in the TLN signal into a non-inverting input terminal of the first differential amplifier 112, a second differential amplifier (buffer) 116, a third amplifier (buffer) 117, resistors R14 and R15, a control means 13 for variably controlling a reference voltage generated by the D/A converter 115 based on the peak and bottom values of the TLN signal detected by the peak and bottom detecting circuit 17, and a digitizing circuit 76 for digitizing the TLN signal.

In more details, an output of the first differential amplifier 112 which generates the TLN signal is connected to its inverting input terminal through the resister R13 in a feedback manner. A signal from the main beam which is formed by summing the detected signals a, b, c and d (RF signal: a+b+c+d) is supplied to the inverting input terminal of the amplifier 112 through a resister R11, and a signal from the two sub-beams which is formed by summing the detected signals e, f, g and h (k' (e+f+g+h)) is supplied to a non-inverting input terminal of the amplifier 112 through a resister R12 which is used to match the level of the latter signal to the level of the main beam signal. The output of the amplifier 112 is supplied to the peak and bottom detecting circuit 17 as the TLN signal. Further, this TLN signal is also supplied to the digitizing circuit 76 and digitized therein, and then it is supplied to the CD servo controller 21 through an output terminal 113.

A first reference voltage of e.g. 2.5V and a second reference voltage of e.g. 1.25V are applied to the D/A converter 115. The control means 13 is constructed so as to be able to variably control a reference voltage outputted from the D/A converter 115 between 1.25V and 2.5V in 256 levels (8 bits), for instance.

The reference voltage outputted from the D/A converter 115 is supplied to an inverting input terminal of the second differential amplifier 116. An output of this second differential amplifier 116 is connected to its non-inverting input terminal in a feedback manner. The output of the second differential amplifier 116 is also connected to a non-inverting input terminal of the third differential amplifier 117 through a resister R14. An output of this third differential amplifier 117 is also connected to its non-inverting input terminal in a feedback manner. Further, a voltage of e.g. 3.75V is also applied to the non-inverting input terminal of the third differential amplifier 117 through a resister R15. The output of the third differential amplifier 117 is also connected to the inverting input terminal of the first differential amplifier 112 through a resister R16.

In this embodiment, in the case where the value of the resistance of the resister R14 is represented by r14 and the value of the resistance of the resister R15 is represented by r15, the values of the r14 and r15 are respectively set so as to have a relationship represented by r14/r15=½. In this way, the reference voltage outputted from the third differential amplifier 117, that is the reference voltage to be inputted into the non-inverting input terminal of the first differential amplifier 112 is variably controlled between 2.1V and 2.9V in 256 levels (8 bits), for instance.

Next, a description will be made with regard to the operation of the TLN signal generating apparatus of the first embodiment having the above structure.

Figure 26:
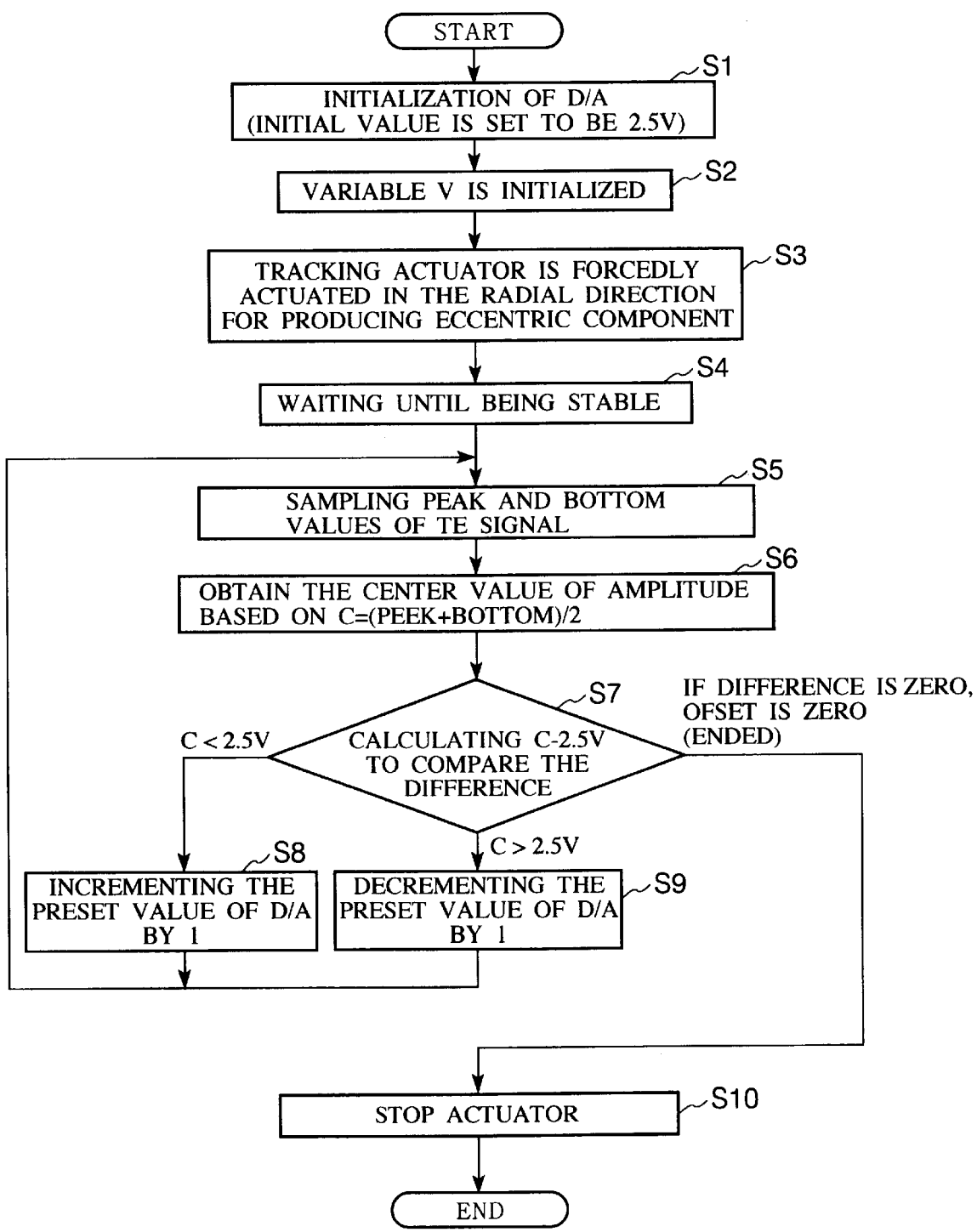
FIG. 26 is a flow chart for explaining the offset component canceling operation performed in the first embodiment of the TLN signal generating apparatus according to the present invention.

This TLN signal generating apparatus is operated in accordance with the flow chart shown in FIG. 26 so as to cancel an offset component of the TLN signal. The process of this flow chart starts at the time when a focus tray is completed (a focus servo is engaged) after an optical disc has been loaded to the optical disc drive 1, and then the process proceeds to Step S1. In this connection, it is to be noted that this flow chart is designed so that an offset component of the TLN signal with respect to the reference voltage of 2.5V is cancelled, that is the center of the amplitudes of the TLN signal is set to be 2.5V.

In Step S1, the control means 13 supplies an address data setting signal for initializing the D/A converter 115 to the D/A converter 115 so as to set an output voltage thereof to be an initial value of 1.875V which is a median voltage value between 1.25V and 2.5V. This means that an input voltage to the non-inverting input terminal of the first differential amplifier 112 is set to be an initial value of 2.5V which is a median voltage value between 2.1V and 2.9V. Then, this process proceeds to Step S2. In this connection, it is to be understood that the D/A converter 115 produces, when it is initialized by the control means 13, a reference voltage of 2.5V (corresponding to a converted value of an input voltage to the non-inverting input terminal of the first differential amplifier 112) which is an analogue signal shown in FIG. 27(a), and then outputs the reference voltage in response to a reference clock signal for signal transmission supplied from the control means 13. This reference voltage is applied to the non-inverting input terminal of the first differential amplifier 112 through the second and third differential amplifiers 116, 117.

In Step S2, the control means 13 initializes the variable V stored therein, and then the process proceeds to Step S3. This variable V is a value which is used to generate a reference voltage for canceling the offset component of the TLN signal from the D/A converter 115. Since the value of the variable which has been used when the optical disc was loaded can not be used as it is, the value is once initialized in this Step S2.

Figure 27:
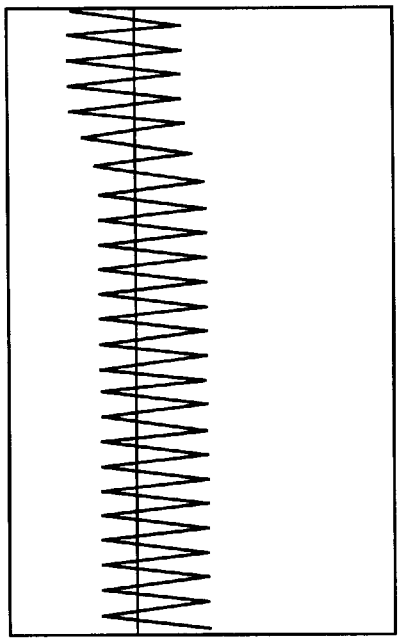
FIGS. 27(a)–27(d) show waveforms which appear in different portions at the offset component canceling operation performed in the TLN signal generating apparatus according to the first embodiment.
Figure 27:
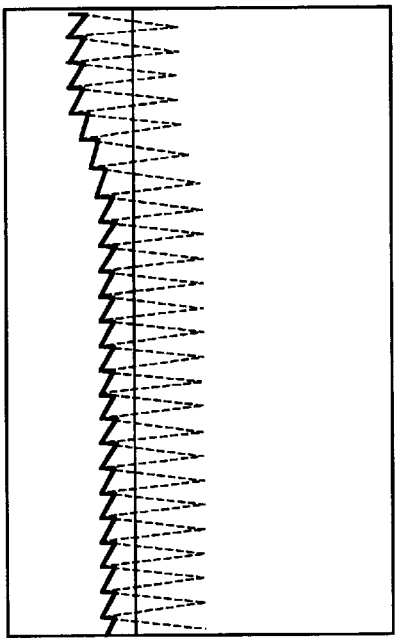
Figure 27:
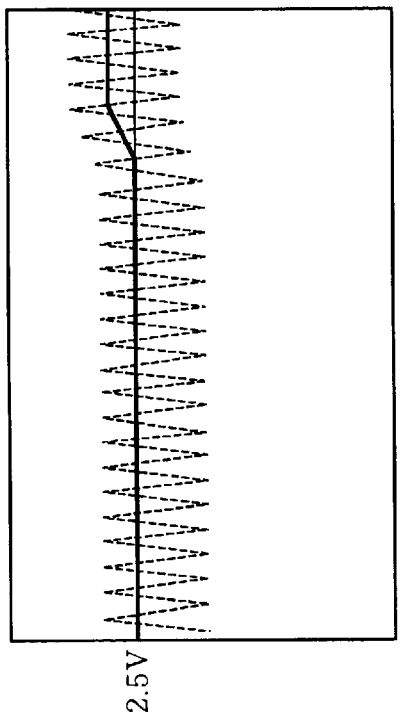
Figure 27:
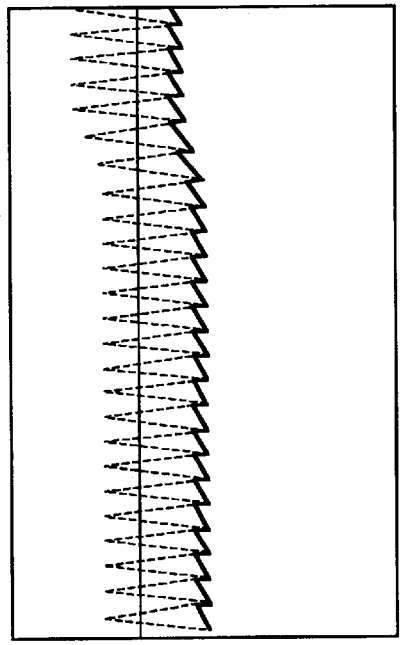

In Step S3, the control means 13 carries out the beam scanning in the radial direction of the loaded optical disc 2 by means of the eccentric component generating apparatus as was described above with reference to FIG. 20 and FIG. 20 so as to produce the eccentric component described above, and then the process proceeds to Step S4. In this way, the TLN signal (having a waveform of a narrow interval) containing a predetermined eccentric component as shown in FIG. 25 is outputted from the first differential amplifier 112. The peak and bottom detecting circuit 17 detects a peak value and a bottom value of thus generated TLN signal as shown in FIG. 27(c) and (d), and then supplies the control means 13 with these values as a bottom hold signal and a peak hold signal, respectively.

In Step S4, the control means 13 is kept in a waiting condition for a predetermined time until the eccentric component produced in Step S3 becomes stable, that is until the TLN signal becomes stable so that an accurate peak hold signal and bottom signal can be supplied. After the predetermined time has elapsed, the process proceeds to Step S5.

In Step S5, the control means 13 carries out sampling of the peak hold signal and the bottom hold signal from the peak and bottom detecting circuit 17 by means of the A/D converter 114, and then acquires the sampling results in the form of digital data. Then, the process proceeds to Step S6.

In Step S6, the control means 13 carries out calculation on the acquired peak hold signal and bottom hold signal to obtain ½ value of the sum of these signals, which is used to determine the center value (C) of the amplitude of the present TLN signal. Then, the process proceeds to Step S7.

In Step S7, the control means 13 detects a difference between 2.5V which is a target center value of the amplitude of the TLN signal and the center value (C) of the amplitude of the present TLN signal which was obtained in Step S6. When it is determined that the difference value is zero, the process proceeds to Step S10, and in this Step the eccentric component generating apparatus is controlled so as to stop the beam scanning in the radial direction of the disc which was started at Step 3, and thereby all the routine of the program shown in FIG. 26 is ended.

On the other hand, if it is determined in Step S7 that the center value (C) of the amplitude of the present TLN signal is less than 2.5V, the control means 13 carries out control so that the reference voltage outputted from the D/A converter 115 becomes 2.5031V (that is, 2.5V+0.0031V) (which is a converted value of an input voltage to the non-inverting input terminal of the first differential amplifier 112) by incrementing the preset value of the D/A converter 115 by one, and then the process returns to Step 5 and the routine comprised of Steps S5 to S7 are repeatedly executed.

Further, if it is determined in Step S7 that the center value (C) of the amplitude of the present TLN signal is greater than 2.5V, the control means 13 carries out control so that the reference voltage outputted from the D/A converter 115 becomes 2.4969V (that is, 2.5V−0.0031V) (which is a converted value of an input voltage to the non-inverting input terminal of the first differential amplifier 112) by decrementing the preset value of the D/A converter 115 by one, and then the process returns to Step 5 and the routine comprised of Steps S5 to S7 are repeatedly executed.

As described above, the reference voltage outputted from the D/A converter 115 (which is a converted value of an input voltage to the non-inverting input terminal of the first differential amplifier 112) is variable between 2.1V and 2.9V in 256 levels with 2.5V as its center. Therefore, the control means 13 controls the reference voltage one by one level in a variable manner until it will be determined that the difference between the center value (C) of the amplitude of the present TLN signal and 2.5V is zero, and for this purpose the routine comprised of Steps S5 to S7 are repeatedly executed. When it is determined at Step S7 that the difference between the center value (C) of the amplitude of the present TLN signal and 2.5V is zero, that is when it is determined that the center value (C) of the amplitude of the present TLN signal is 2.5V, a determination is made that the offset component of the TLN signal has been cancelled, and then all the routine of the program shown in FIG. 26 is ended after the Step S10 has been executed.

As described above, according to the TLN signal producing apparatus of the first embodiment, it is possible to cancel the offset component contained in the TLN signal by carrying out variable control for the output voltage value of the D/A converter which generates the reference voltage, and this has a good response for fluctuation of the amplitude of the TLN signal. In this way, the TLN signal becomes always intersected with the reference level L1 as was described with reference to FIG. 22 and FIG. 24, so that it becomes possible to accurately digitize the TLN signal by the digitizing circuit 76 (the PU drive and control signal generating circuit 18 shown in FIG. 2). With this result, since it is possible to accurately count the number of tracks above which the optical pick-up 3 has traversed, accuracy in the fine search can be remarkably improved. In addition, even if an optical disc 2 in which no data is recorded or an optical disc 2 having a recorded portion and a non-recorded portion is used, it is possible to move the optical pick-up 3 to the target track accurately.

Although the above explanation has been made with reference to the example in which the initial value of the reference voltage outputted from the D/A converter 115 is set to be a voltage vale of 2.5V (which is a converted value of an input voltage to the non-inverting input terminal of the first differential amplifier 112) which is a median value of the variable range, and from this state the reference voltage is gradually varied based on the difference between the center value of the amplitude of the present TLN signal and the target value (target voltage value). However, besides the above example, the present invention can be applied to a modification in which the initial value of the reference voltage outputted from D/A converter 115 is set to be a voltage vale of 2.1V (which is a converted value of an input voltage to the non-inverting input terminal of the first differential amplifier 112) which is the minimum value in the variable range, and from this state the reference voltage value is gradually raised based on difference between the center value of the amplitude of the present TLN signal and the target value (target voltage value).

Figure 28:
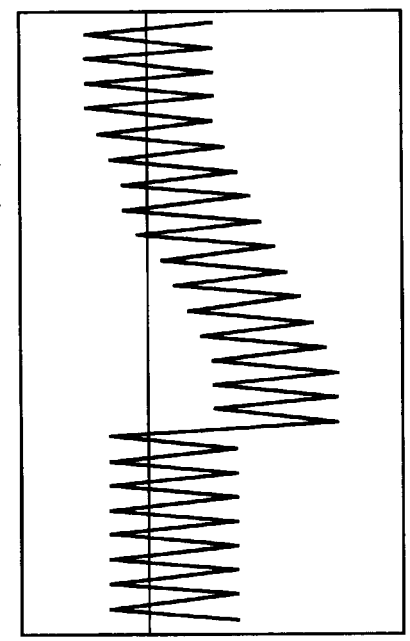
FIGS. 28(a)–28(d) show waveforms which appear in different portions at the offset component canceling operation performed in a modified TLN signal generating apparatus according to the first embodiment of the present invention.
Figure 28:
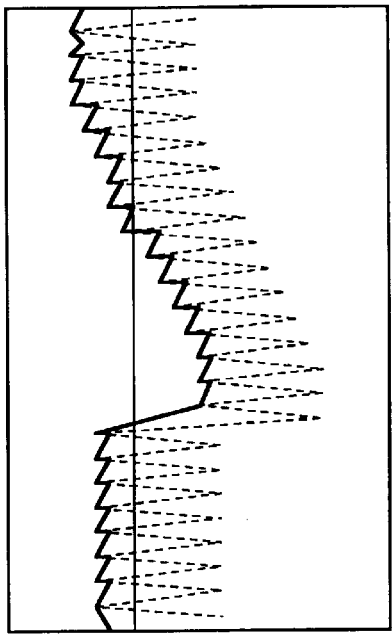
Figure 28:
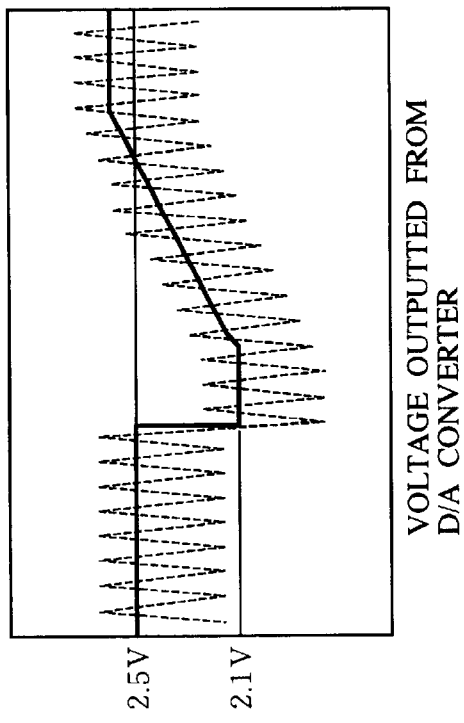
Figure 28:
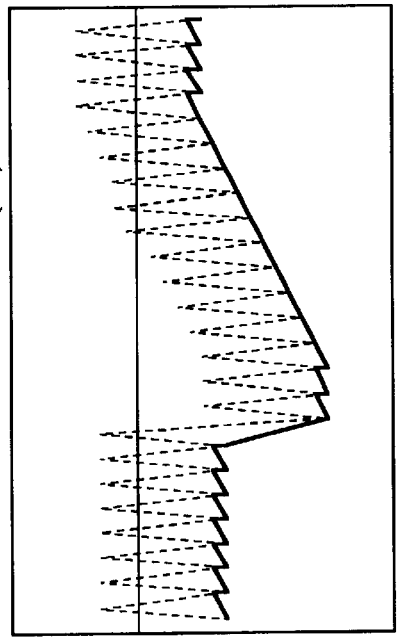

For better understanding, examples of the respective waveforms of the TLN signal, the bottom hold signal and the peak hold signal under this variable control are shown in FIGS. 28(b) to (d).

Further, on the contrary to the modification described above, the present invention can be also applied to another modification in which the initial value of the reference voltage outputted from D/A converter 115 is set to be a voltage vale of 2.9V (which is a converted value of an input voltage to the non-inverting input terminal of the first differential amplifier 112) which is the maximum value in the variable range, and from this state the reference voltage value is gradually lowered based on difference between the center value of the amplitude of the present TLN signal and the target value (target voltage value).

Furthermore, these examples can be constructed so that the difference between the center value of the amplitude of the TLN signal and the target value becomes zero only by one time adjustment of the reference voltage value. In this regard, it is to be noted that all of these examples can achieve the same effect as described above.

Moreover, although in the first embodiment described above the offset component canceling operation is to be carried out at the time when an optical disc has been loaded, it is also possible to carry out such a canceling operation not only at the time when an optical disc has been loaded but also at every time upon a focus servo being engaged.

Hereinbelow, with reference to FIG. 29 to FIG. 33, a second embodiment of the TLN signal generating apparatus of the present invention will be described.

Figure 29:
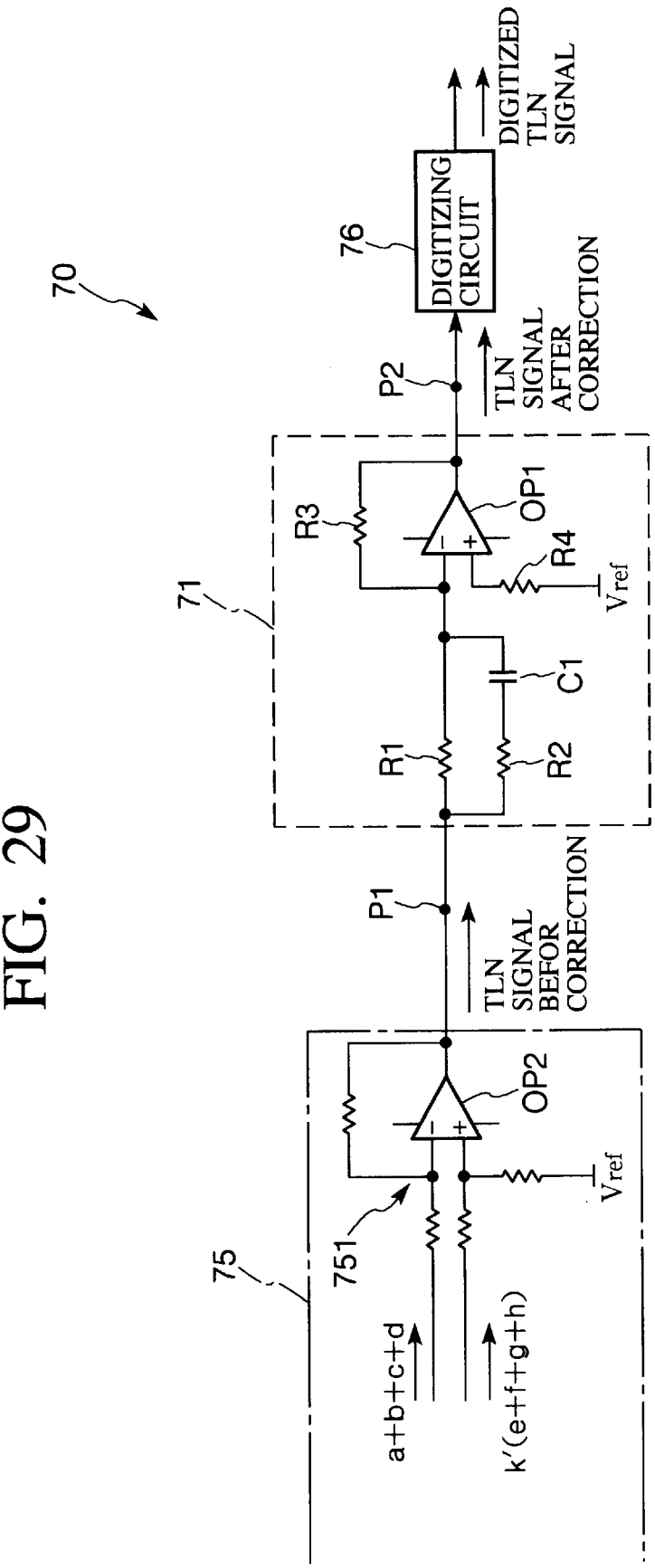
FIG. 29 is a block diagram which shows a circuit configuration of a second embodiment of the TLN signal generating apparatus according to the present invention.

FIG. 29 is a block diagram which shows a circuit configuration of the second embodiment of the TLN signal generating apparatus used in the optical disc drive 1.

As shown in FIG. 29, the TLN signal generating apparatus 70 constitutes a part of the pick-up drive and control signal generating circuit 18, which generally comprises a TLN signal generating circuit 75, and a high boost filter (signal correcting circuit) 71 for correcting the TLN signal supplied from the TLN signal generating circuit 75, and a digitizing circuit 76 for digitizing the TLN signal fed from the high boost filter 71.

The TLN signal generating circuit 75 is constructed from a differential amplifier 751 provided with an operational amplifier OP2 and the like.

The high boost filter 171 is generally composed of resisters R1, R2, R3 and R4, a capacitor C1 and an operational amplifier OP1. Namely, a serial connection circuit comprised of the resister R2 and the capacitor C1 is connected in parallel to the resister R1, and an output side thereof is connected to a minus terminal of the operation amplifier OP1, and the minus terminal is connected to an output side of the operational amplifier OP1 through the resister R3.

Further, a reference voltage Vref is applied to the plus input terminal of the operation amplifier OP1 through the resister R4.

As shown in FIG. 30, this high boost filter 171 has characteristics in that amplification factor increases linearly within a frequency band from 10 Hz (first frequency) to 1 kHz (second frequency), so that it has an amplification factor of about 1 time (0 dB) when the frequency is less than or equal to 10 Hz and amplification factor of about 5 times (14 dB) when the frequency is less than or equal to 1 kHz.

The TLN signal generated in the TLN signal generating circuit 75 is inputted into the high boost filter 71 and it is corrected therein. Namely, when the TLN signal is passed through the high boost filter 71, a direct current component and an alternating current component less than or equal to 10 Hz pass therethrough without being amplified, so that an alternating current component higher than or equal to 1 kHz is amplified by about 5 times.

Normally a frequency of the TLN signal upon the track jump is about 2 to 3 kHz. Therefore, only a necessary component in the TLN signal is amplified by about 5 times by passing the TLN signal through the high boost filter 71.

The TLN signal which has been corrected by the high boost filter 71 is inputted into the digitizing circuit 76 as described above, and then digitized in the digitizing circuit 76. Thus digitized TLN signal is inputted into the CD servo controller 21 and it is then used for a fine search.

Figure 31:
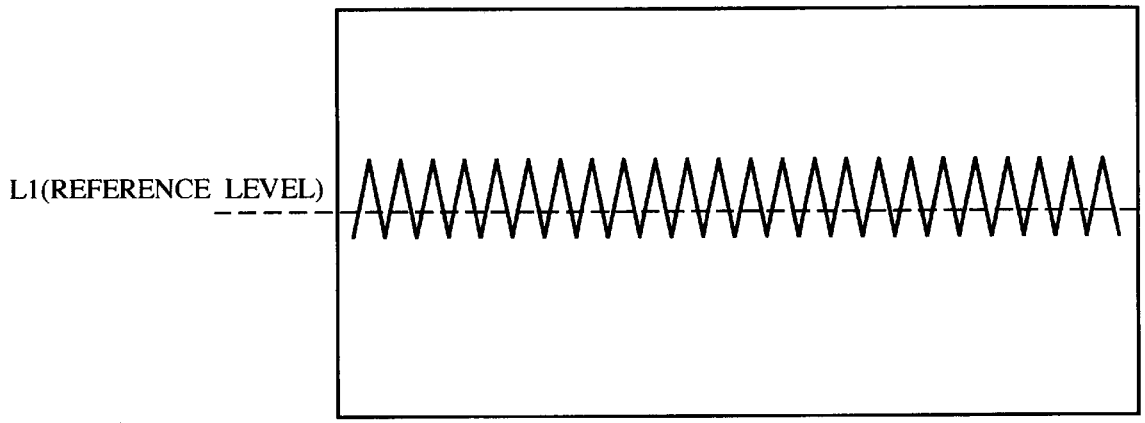
FIG. 31 is a drawing which shows a waveform of the TLN signal before passing through the high boost filter.
Figure 32:
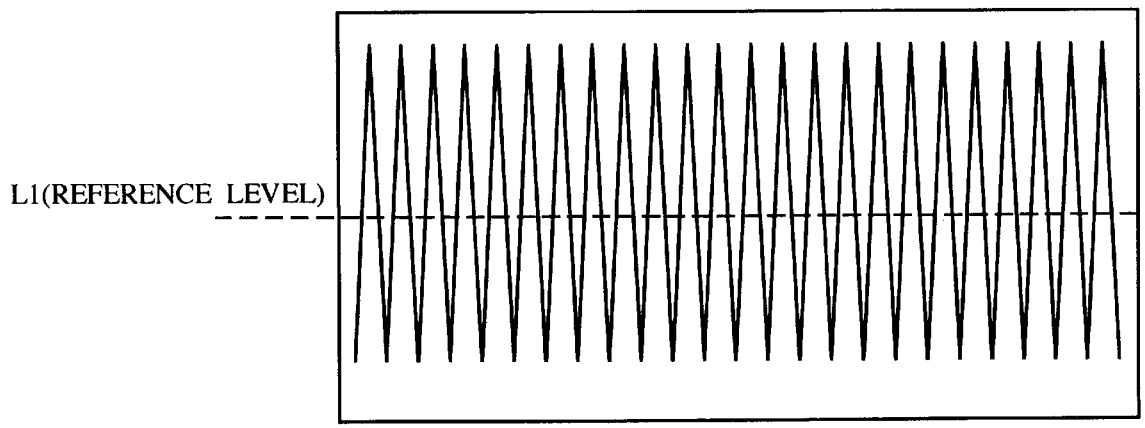
FIG. 32 is a drawing which shows a waveform of the TLN signal after passing through the high boost filter.

FIG. 31 shows the TLN signal before passing through the high boost filter 71 (point P1 in FIG. 29), and FIG. 32 shows the TLN signal after passing through the high boost filter 71 (point P2 in FIG. 29).

As shown in these drawings, the level of the alternating current component of the TLN signal after passing through the high boost filter 71 (point P2 in FIG. 29) shown in FIG. 32 is greater than that of the TLN signal before passing through the high boost filter 71 (point P1 in FIG. 29) shown in FIG. 31. Therefore, the TLN signal which has passed through the high boost filter 71 always intersects with the reference level without receiving any influence from the offset component contained in the TLN signal. As a result, since it is possible to accurately digitize the TLN signal, the number of tracks above which the optical pick-up 2 has traversed can be counted accurately, thereby making it possible to remarkably improve the accuracy at the fine search. This means that even if an optical disc in which no data has yet been recorded or an optical disc which has a recorded portion and a non-recorded portion is used, it is possible to move the optical pick-up 3 to the target track accurately.

In this connection, it is to be noted that the amplification factor of the alternating current component in each of the first and second frequencies at the high boost filter 171 and the frequency (frequency band) of each of the first and second frequencies can be adjusted (set) in a desirable manner by changing any one of the size of any one or more of the resisters R1 to R3 and the capacitance of the capacitor C1, respectively.

In the above, the second embodiment of the TLN signal generating apparatus of the present invention was described with reference to the drawings. However, the present invention is not limited to the embodiment and the structure of the respective components or elements may be replaced with other components or elements having the same function.

For example, instead of the high boost filter used in the second embodiment, other circuits can be used if they have a function that amplifies an alternating current component contained in the TLN signal without eliminating a direct current component contained in the TLN signal.

(8) Amplitude Adjustment Operation for Tracking Error Signal

As was described above, in recent years, various optical discs such as CD-R, CD-ROM, CD-RW have been developed and then widely used. Therefore, it is desired that it is possible to playback and record these optical discs with a single optical disc drive in a compatible manner. However, since the reflectances of the reflective layers of CD-R, CD-ROM and CD-RW are different from each other, the tracking error signals obtained from these optical discs are also different from each other. Further, even among optical discs of the same type, there is a case that amplitudes of tracking error signals are different from each other due to individual differences.

Specifically, if an amplitude of a tracking error signal reproduced from a data disc of CD-R (having pre-pits) is supposed to be 1, an amplitude of a tracking error signal reproduced from a data disc of CD-ROM is approximate to 0.7 and an amplitude of a tracking error signal reproduced from a data disc of CD-WR is approximate to 3.5, respectively. Therefore, if amplitude adjustment would not be performed so as to meet the respective disc, a tracking servo will not be engaged properly, thus making it difficult to perform accurate recording and playing back control. For these reasons, the optical disc drive 1 of the present invention is provided with an amplitude adjustment apparatus which adjusts an amplitude of a tracking error signal into the optimum state.

Figure 33:
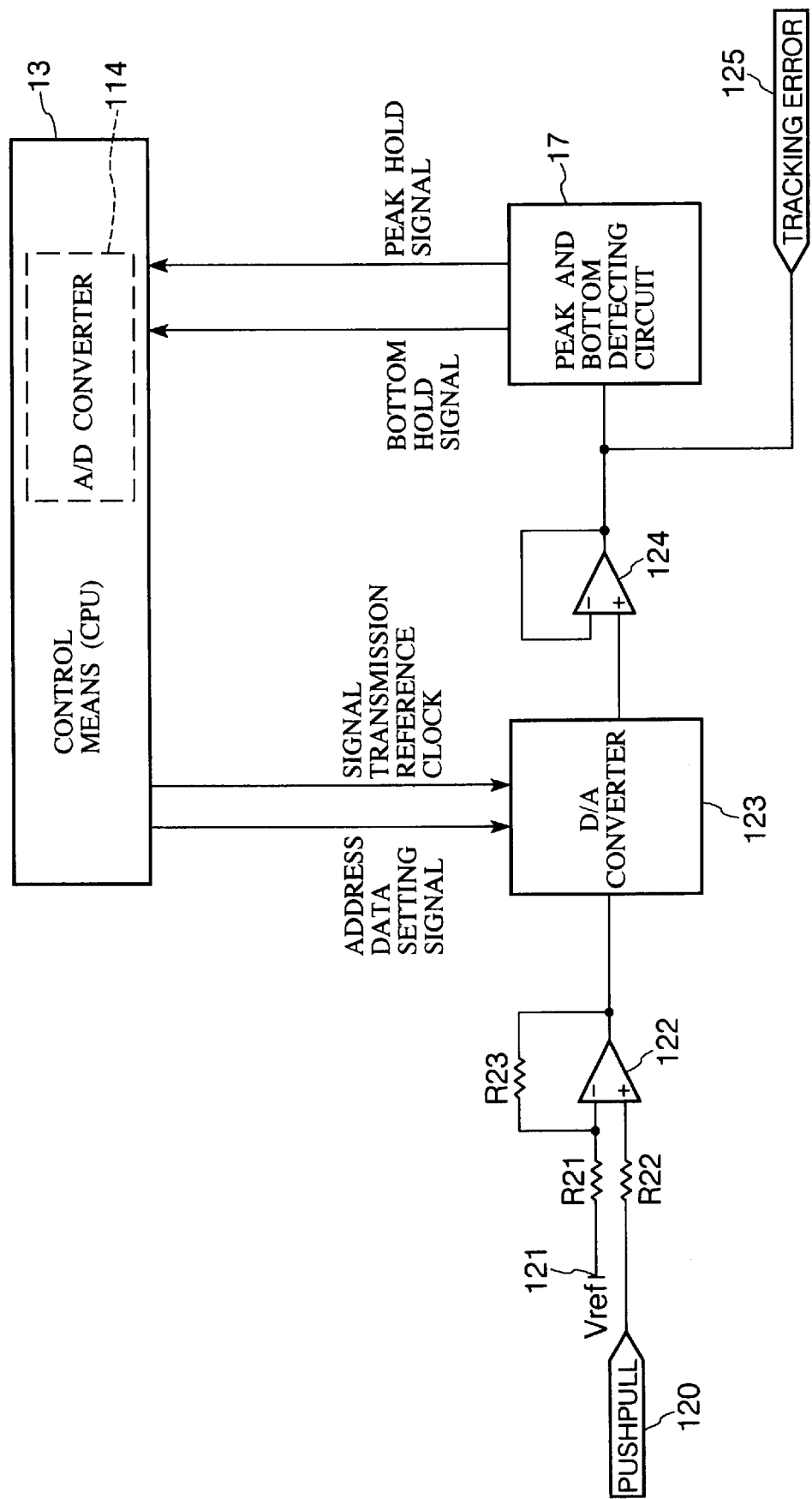
FIG. 33 shows a circuit configuration of an amplitude adjusting apparatus for a tracking error signal provided in the optical disc drive according to the present invention.
Figure 34:
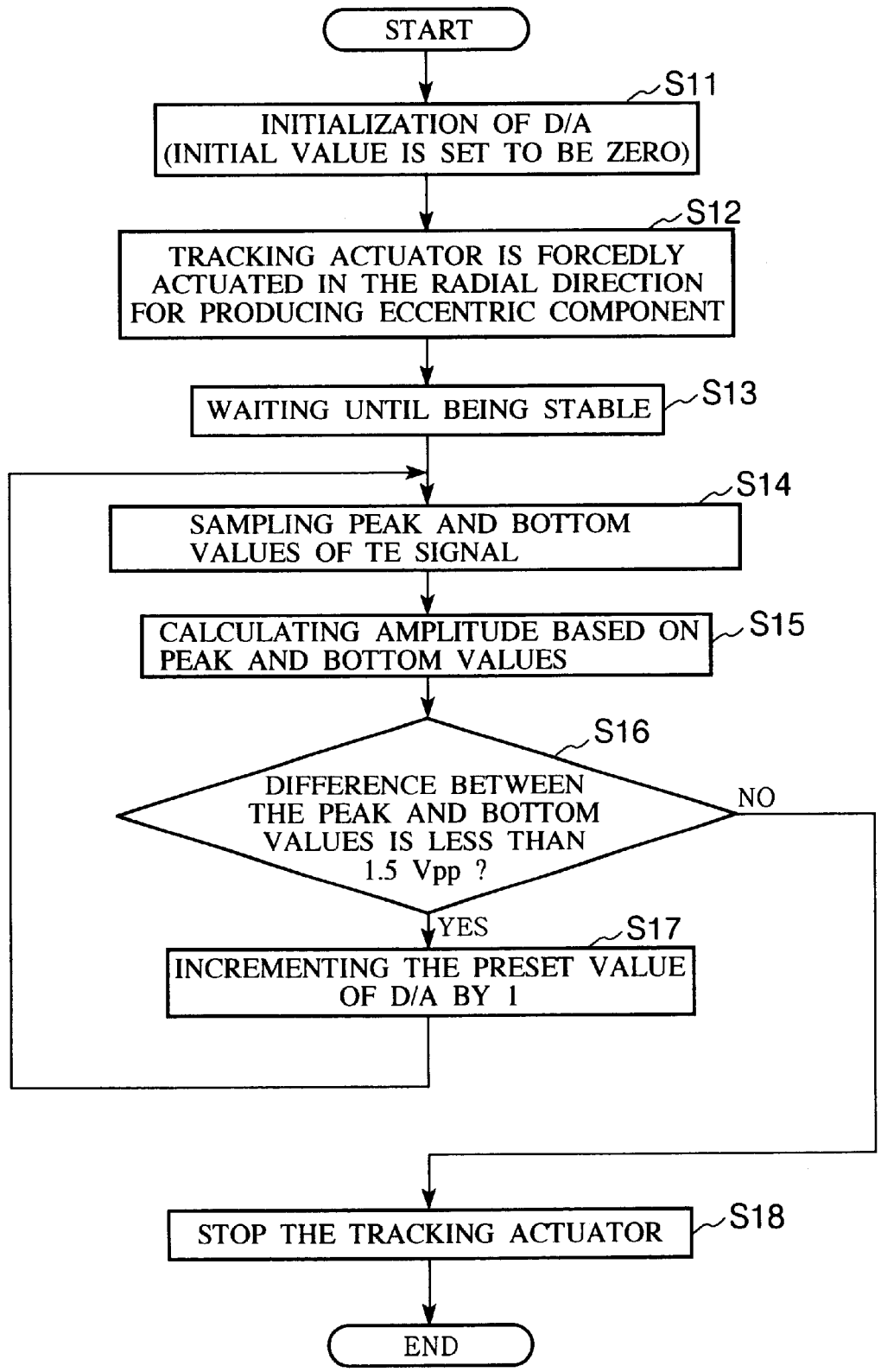
FIG. 34 is a flow chart for explaining the amplitude adjustment operation of the amplitude adjusting apparatus.

FIG. 33 shows a circuit configuration of the amplitude adjustment apparatus. In FIG. 33, the amplitude adjustment apparatus is generally composed of a differential amplifier 122 which generates a tracking error signal, a D/A converter 123 which outputs an tracking error signal having an optimum amplitude by multiplying the tracking error signal from the differential amplifier 122 by an optimum coefficient, a differential amplifier (buffer) 124 provided at the output side of the D/A converter 123, a peak and bottom detecting circuit 17 which detects a peak value and a bottom value of the tracking error signal from the differential amplifier 124, and a control means 13 for variably controlling the coefficient M in the D/A converter 123 in e.g. 256 levels (8 bits) based on the peak value and bottom values of the tracking error signal detected by the peak and bottom detecting circuit 17. In this regard, it is to be noted that in this embodiment, the coefficient M is represented by the following Equation (3).

Coefficient $M=N/256$ (here, $N$ is an integer from 0 to 255)  (3)

In more details, an output of the differential amplifier 122 is connected to its inverting input terminal in a feedback manner. A reference voltage (Vref) is supplied from an input terminal 121 to the inverting input terminal of the amplifier 122 through a resister R21, and a tracking error signal in the form of a push pull signal is supplied from the input terminal 120 to a non-inverting input terminal of the amplifier 122 through a resister R22. Further, the differential amplifier 124 is constructed so that an output thereof is returned to its non-inverting input terminal in a feedback manner, and the tracking error signal from the D/A converter 123 which has undergone the amplitude adjustment is supplied to an inverting input terminal of the amplifier 124. Furthermore, the tracking error signal outputted from the differential amplifier 124 is supplied to the peak and bottom detecting circuit 17 as well as the CD servo controller 21 through an output terminal 125.

In this regard, it is to be noted that the tracking error signal supplied from the input terminal 120 is amplified by the differential amplifier 122 to a required and sufficient level, and then it is inputted into the D/A converter 123 where it undergoes the amplitude adjustment.

Hereinafter, a description will be made with reference to the operation of the amplitude adjustment apparatus for the tracking error signal having the above described structure.

The amplitude adjustment apparatus is operated in accordance with the flow chart shown in FIG. 30 to carry out the amplitude adjustment for the tracking error signal. The process of this flow chart starts at the time when a focus tray is completed (a focus servo is engaged) after an optical disc has been loaded to the optical disc drive 1, and then the process proceed to Step S1. In this connection, it is to be noted that this flow chart is designed so that an amplitude adjustment is carried out in such a way that the value of the amplitude of the tracking error signal becomes approximate to 1.5 Vpp.

In Step S11, the control means 13 supplies an address data setting signal to the D/A converter 123 for initializing the coefficient M in the D/A converter 123 into zero (that is, 0/256), and then the process proceeds to Step S12.

In Step S12, the control means 13 carries out the beam scanning in the radial direction of the loaded optical disc 2 by means of the eccentric component generating apparatus as was described above with reference to FIG. 20 and FIG. 21 so as to produce the eccentric component described above, and then the process proceeds to Step S4. In this way, a tracking error signal containing a predetermined eccentric component as shown in FIG. 35(*a*) (that is, a tracking error signal having a waveform of a narrow interval) is outputted from the differential amplifier 122 shown in FIG. 33, and then it is supplied to the D/A converter 123.

Figure 35:
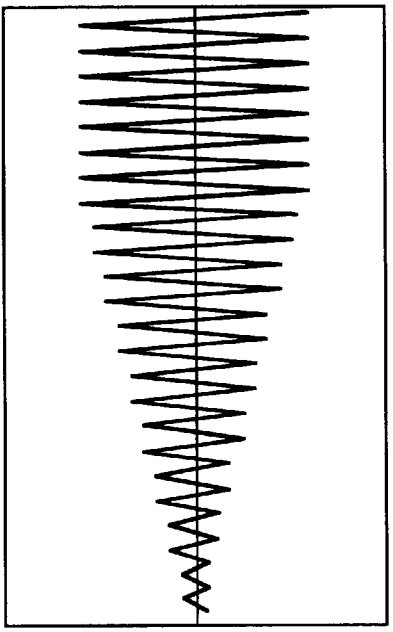
FIGS. 35(a)–35(d) waveforms which appear in different portions at the amplitude adjustment operation of the amplitude adjusting apparatus.
Figure 35:
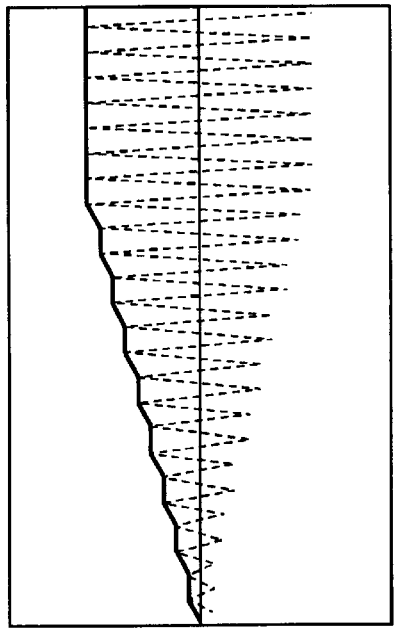
Figure 35:
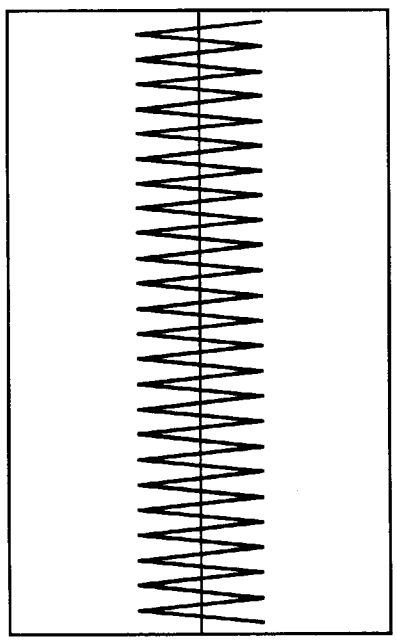
Figure 35:
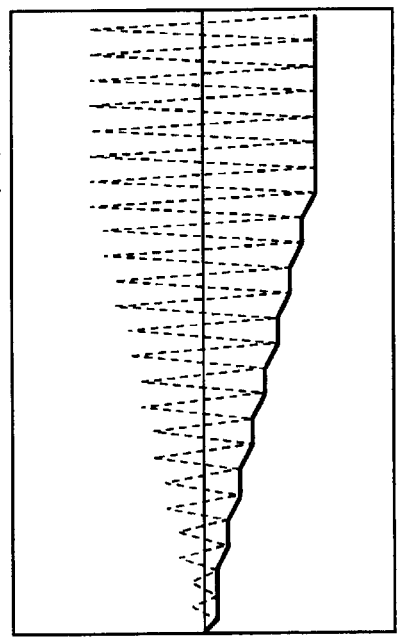
Figure 36:
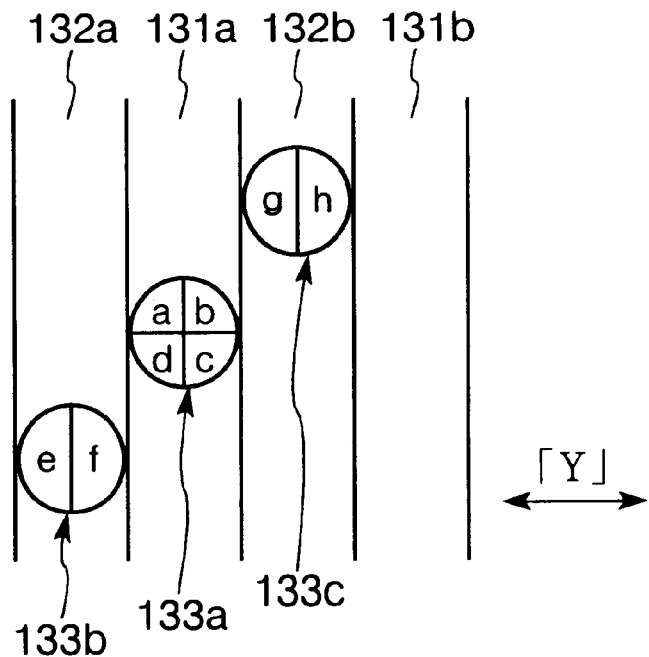
FIG. 36 is a schematic drawing which shows pre-grooves and lands formed in an optical disc.
Figure 37:
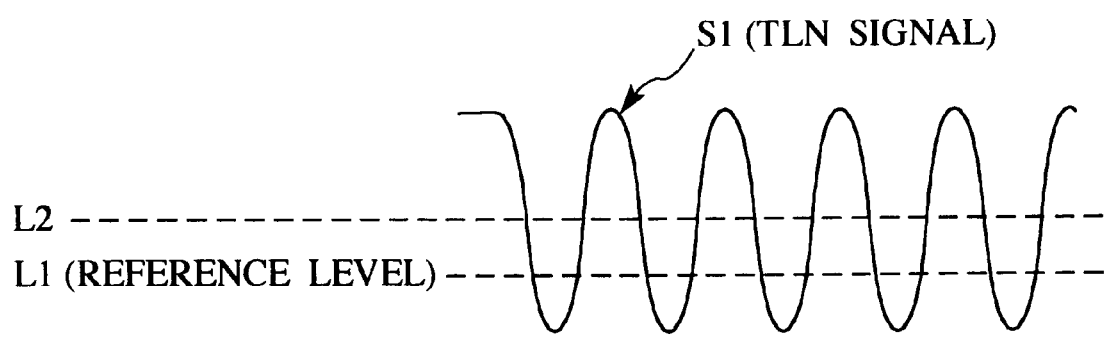
FIG. 37 is a schematic drawing which shows a TLN signal and a reference level.

The D/A converter 123 carries out amplitude adjustment by multiplying the tracking error signal supplied from the differential amplifier 122 by the coefficient M (=0) which has been initialized by the control means 13, and then outputs the tracking error signal as shown in FIG. 35(*b*) which has undergone the amplitude adjustment in response to a reference clock for signal transmission supplied from the control means 13. The tracking error signal is supplied to the peak and bottom detecting circuit 17 through the differential amplifier 124. As shown in FIG. 35(*c*) and FIG. 35(*d*), the peak and bottom detecting circuit 17 detects a peak value and a bottom value of the tracking error signal which has undergone the amplitude adjustment, and then supplies these values to the control means 13 as a peak hold signal and a bottom hold signal, respectively.

In Step S13, the control means 13 is kept in a waiting condition for a predetermined time until the eccentric component generated in Step S12 becomes stable, that is until the tracking error signal becomes stable so that an accurate peak hold signal and bottom signal can be supplied. After the predetermined time has elapsed, the process proceeds to Step S14.

In Step S15, the control means 13 carries out sampling of the peak hold signal and the bottom hold signal from the peak and bottom detecting circuit 17 by means of the A/D converter 114, and then acquires the sampling results in the form of digital data. Then, the process proceeds to Step S15.

In Step S15, the control means 13 detects a difference value (pp: peak to peak) between the acquired peak hold signal and the bottom hold signal, thereby detecting the amplitude value of the present tracking error signal, and the process proceeds to Step S16.

In Step S16, the control means 13 determines as to whether the amplitude value of the tracking error signal detected in Step S15 is less than 1.5 Vpp which is a target value. The value of 1.5 Vpp described herein means the minimum amplitude value. Therefore, in this Step S16, a determination is made to know as to whether or not the amplitude value of the present tracking error signal exceeds the minimum value which is the value that will not affect the tracking servo system in the subsequent stages. In the case where "NO" determination is made in this Step S16, that is to say in the case where the amplitude value of the present tracking error signal is equal to 1.5 Vpp or slightly greater than 1.5 Vpp, the process proceeds to Step S18 in order to show that the amplitude value of the tracking error signal is in an appropriate value, in which the control means 13 controls the eccentric component generating apparatus so as to stop the beam scanning in the radial direction of the disc started at Step S12, and thereby all the routine of the program shown in FIG. 30 is ended.

On the other hand, in the case where "YES" determination is made in the Step S16, that is to say in the case where the amplitude value of the present tracking error signal is less than 1.5 Vpp, the control means 13 increases the coefficient M which is multiplied to the tracking error signal at the D/A converter 123 by 1/256 by incrementing the preset value N in the D/A converter 123 shown in Equation (3) described above in order to perform the amplitude adjustment for the tracking error signal again, thereby the process returns to Step S14 and then the routine comprised of Steps S14 to S16 is executed repeatedly.

As described above, the coefficient M which is to be multiplied to the tracking error signal at the D/A converter 123 is variable within 256 levels. Therefore, the control means 13 carries out the variable control for the coefficient M one level by one level (that is, 1/256 at a time) at Step S 16 until it is determined that the amplitude value of the present tracking error signal becomes greater than 1.5 Vpp which is a target value, and for this purpose the control means 13 executes the routine comprised of Steps S14 to S16 repeatedly. Then, when it is determined that the amplitude value of the present tracking error signal has become greater than 1.5 Vpp at Step S16, a determination is made that the amplitude value of the tracking error signal has become the optimum value, and then all the routine of the program shown in FIG. 30 is ended after the Step S18 has been executed.

As described above, the amplitude adjustment apparatus makes it possible to control the amplitude value of the tracking error signal into the optimum value by performing the variable control for the coefficient which is used in a multiplication process for the tracking error signal. Therefore, it is possible to adjust the amplitude value of the tracking error signal to a constant value irrespective of different types of optical discs such as CD-R, CD-ROM and CD-RW and individual differences in the same type optical discs, thereby making it possible to obtain a constant gain in the tracking servo system and a stability of the tracking servo system.

Although the above explanation was made with reference to the case where the control means 13 gradually increments the coefficient which is used in the multiplication process for the tracking error signal 1/256 by 1/256 from 1, it is also possible to decrement it one 1/256 by 1/256 from 2 in a contrary manner. Alternatively, it is also possible to previously set a coefficient suited for a frequently used optical disc in the D/A converter 123 as an initial value, and then increment or decrement the coefficient by a predetermined number from the initial value. The same result described above can be also obtained in this modification.

Although in the foregoing the description was made with regard to the embodiments of the TLN signal generating apparatus used in then optical disc drive and the optical disc drive equipped with the TLN signal generating apparatus as well as the amplitude adjusting apparatus for the tracking error signal according to the present invention, the present invention is not limited to these embodiments, and it goes without saying that the structure of each component or element cane be replaced with other structure having the same function.

For example, the optical disc drive according to the present invention is not limited to a CD-R drive described above. The present invention can be applied to other various disc drives which can play back or record and playback optical discs having a pre-groove such as CD-RW, DVD-R, DVD-RAM and the like and which can only play back optical discs such as CD (compact disc), CD-ROM and the like.

As described above, according to the TLN signal generating apparatus used in an optical disc drive and an optical disc drive equipped with the TLN signal generating apparatus of the present invention, it is possible to digitize the TLN signal accurately without receiving any influence from the offset component contained in the TLN signal (track loss signal).

In particular, according to the structure of the first embodiment, since the level of the TLN signal is controlled by adjusting the reference voltage value which is used when the TLN signal is generated, the apparatus can realize a good response to the fluctuation of the amplitude of the TLN signal. Further, according to the structure of the second embodiment, since an alternating current component contained in the TLN signal is amplified without eliminating a direct current component contained in the TLN signal, it can also realize a good response to the fluctuation of the amplitude of the TLN signal.

Further, in the case where the optical pick-up is moved to a target track by grasping the radial position of the optical pick-up relative to the optical disc based on the TLN signal, it is possible to accurately count the number of tracks above which the optical pick-up has traversed, so that it becomes possible to move the optical pick-up to the target track accurately.

Further, according to the optical disc drive equipped with the amplitude adjusting apparatus for tracking error signal, it is possible to adjust the value of the amplitude in a constant value irrespective of types of optical discs and individual differences between the same optical discs. This makes it possible to hold a gain in the tracking servo constant and to obtain stability in the tracking servo operation.

Finally, it is to be noted that the present invention is no way limited to the embodiments described above, and any modification and addition can be made without departing from the scope of the present invention which is defined by the following claims.

What is claimed is:

1. An optical disc drive equipped with a TLN signal generating apparatus, the TLN signal generating apparatus comprising:
    TLN signal generating means for generating a TLN signal (track loss signal) based on signals obtained from an optical pick-up;
    a digitizing circuit for digitizing the TLN signal generated by the TLN signal generating means by comparing it with a reference level; and
    correction means for correcting the TLN signal generated by the TLN signal generating means so that it is accurately digitized by the digitizing circuit irrespective of an offset component which is a direct current component contained in the TLN signal.

2. The optical disc drive as claimed in claim 1, wherein the correction means includes:
    offset component detecting means for detecting a level of the offset component contained in the TLN signal; and
    signal control means for controlling, responsive to the level of the offset component detected by the offset component detecting means, a level of the TLN signal generated by the TLN signal generating means so that the level of the TLN signal will become a level which does not receive any influence from the level of the direct component.

3. The optical disc drive as claimed in claim 2, wherein the signal control means controls, responsive to the level of the offset component detected by the offset component detecting means, a level of the TLN signal generated by the TLN signal generating means so that the offset component is decreased or eliminated.

4. The optical disc drive as claimed in claim 3, wherein the offset component detecting means is constructed so as to detect a peak value and a bottom value of the TLN signal generated by the TLN signal generating means and then obtain the level of the offset component based on the peak and bottom values.

5. The optical disc drive as claimed in claim 3, wherein the offset component detecting means is constructed so as to detect a median value between a peak value and a bottom value of the TLN signal generated by the TLN signal generating means or a value calculated based on the median value as the level of the offset component.

6. The optical disc drive as claimed in claim 3, wherein the signal correction means includes a reference voltage output means for outputting a reference voltage used in generating the TLN signal by the TLN signal generating means; and means for variably controlling the reference voltage outputted from the reference voltage output means.

7. The optical disc drive as claimed in any one of claim 1, wherein the TLN signal generating apparatus further comprises an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

8. The optical disc drive as claimed in any one of claim 1, wherein the correction means includes a signal correcting circuit which amplifies an alternating current component contained in the TLN signal generated by the TLN signal generating means without eliminating a directed current component contained in the TLN signal.

9. The optical disc drive as claimed in claim 8, wherein the signal correcting circuit is constructed so as not to eliminate an alternating current component contained in the TLN signal and having a frequency less than a first frequency and the direct current component contained therein, but so as to amplify an alternating current component contained in the TLN signal and having a frequency higher than a second frequency which is higher than the first frequency.

10. The TLN signal generating apparatus as claimed in claim 9, wherein the signal correcting circuit includes a high boost filter.

11. A TLN signal generating apparatus used in an optical disc drive, which comprises:

TLN signal generating means for generating a TLN signal (track loss signal) based on signals obtained from an optical pick-up;

offset component detecting means for detecting an offset component (direct current component) contained in the TLN signal generated by the TLN signal generating means;

signal control means for controlling, responsive to a level of the offset component detected by the offset component detecting means, a level of the TLN signal generated by the TLN signal generating means so that the offset component in the TLN signal is reduced or eliminated therefrom; and a digitizing circuit for digitizing the TLN signal which has been corrected by the signal control means by comparing it with a reference level.

12. The TLN signal generating apparatus as claimed in claim 11, wherein the offset component detecting means is constructed so as to detect a peak value and a bottom value of the TLN signal generated by the TLN signal generating means and then obtain the level of the offset component based on the peak and bottom values.

13. The TLN signal generating apparatus as claimed in claim 11, wherein the offset component detecting means is constructed so as to detect a median value between a peak value and a bottom value of the TLN signal generated by the TLN signal generating means or a value calculated based on the median value as the level of the offset component.

14. The TLN signal generating apparatus as claimed in claim 11, wherein the signal correction means includes a reference voltage output means for outputting a reference voltage used in generating the TLN signal by the TLN signal generating means; and means for variably controlling the reference voltage outputted from the reference voltage output means.

15. The TLN signal generating apparatus as claimed in claim 11, wherein the TLN signal generating apparatus further comprises an optical pick-up driving means for driving and controlling the optical pick-up so that a beam emitted onto the optical disc after a focus servo has been engaged is displaced along the radial direction of the optical disc; and an eccentric component generating means for generating an eccentric component based on the reflected light of the beam obtained when the optical pick-up is controlled and driven by the optical pick-up driving means.

* * * * *

UNITED STATES PATENT AND TRADEMARK OFFICE
CERTIFICATE OF CORRECTION

PATENT NO. : 6,606,286 B1
DATED : August 12, 2003
INVENTOR(S) : Maekawa

It is certified that error appears in the above-identified patent and that said Letters Patent is hereby corrected as shown below:

<u>Title page,</u>
Item [73], Assignee, change "Mitburri Electric Co., LTD, Tokyo" to -- Mitsumi Electric Co., LTD, Tokyo --.

<u>Column 2,</u>
Line 30, change "sifted" to -- shifted --

<u>Column 6,</u>
Line 67, change "an" to -- a --

<u>Column 14,</u>
Line 64, change "3T-1T" to -- 3T-11T --

<u>Column 15,</u>
Line 9, change "C2 error correction" to -- C2 error correction --

<u>Column 19,</u>
Line 25, change "send" to -- sends --

<u>Column 21,</u>
Line 21, change "include" to -- including --

<u>Column 28,</u>
Line 36, change "FIG. 20 and FIG. 20" to -- FIG. 20 --

<u>Column 32,</u>
Line 33, change "an" to -- a --

UNITED STATES PATENT AND TRADEMARK OFFICE
CERTIFICATE OF CORRECTION

PATENT NO. : 6,606,286 B1
DATED : August 12, 2003
INVENTOR(S) : Maekawa

It is certified that error appears in the above-identified patent and that said Letters Patent is hereby corrected as shown below:

Column 35,
Line 7, change "cane" to -- can --

Signed and Sealed this

Second Day of March, 2004

JON W. DUDAS
*Acting Director of the United States Patent and Trademark Office*